US006567627B2

United States Patent
Maeda et al.

(10) Patent No.: US 6,567,627 B2
(45) Date of Patent: May 20, 2003

(54) OPERATING DEVICE HAVING A SHORTCUT KEY FOR SETTING FUNCTIONS

(75) Inventors: Tetsuya Maeda, Neyagawa (JP); Tetsuya Yoshioka, Suita (JP); Yoshiyuki Fujiwara, Matsubara (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 09/918,045

(22) Filed: Jul. 30, 2001

(65) Prior Publication Data

US 2002/0015598 A1 Feb. 7, 2002

(30) Foreign Application Priority Data

Jul. 31, 2000 (JP) .................................... 2000-232190
Mar. 21, 2001 (JP) .................................... 2001-080092

(51) Int. Cl.[7] .............................................. G03G 21/00
(52) U.S. Cl. .......................................... 399/81; 399/83
(58) Field of Search .......................... 361/681; 399/81, 399/82, 83, 85, 86

(56) References Cited

U.S. PATENT DOCUMENTS 5,977,954 A * 11/1999 Arimoto et al. ............... 399/81
6,285,842 B1 * 9/2001 Katamoto et al. ............ 399/81

* cited by examiner

Primary Examiner—Hoang Ngo
(74) Attorney, Agent, or Firm—Jordan and Hamburg LLP

(57) ABSTRACT

An image reading device and image forming device has an operation device provided with keys for reducing the number of operations. A shortcut key display screen having a shortcut key to which an arbitrary function among a plurality of functions may be allocated thereto is displayable on a display unit. At least one function setting screen has an allocation instruction key for allocating a function to the shortcut key. When the allocation instruction key is selected, a series of functions set, before the function setting screen having the allocation instruction key is displayed on the display screen, is allocated to the shortcut key.

16 Claims, 26 Drawing Sheets

FIG.16

5a | COPY READY

SELECT PAPER | REDUCE/ENLARGE SELECT | MARGIN | 2 IN 1 — K2
1. A4 LANDSCAPE | 4. B4 PORTRAIT
2. A4 PORTRAIT | MANUAL PAPER FEED | 100%
3. A3 PORTRAIT | AUTOMATIC | REDUCE/ENLARGE SELECT | BASIC 3

BASIC | EDIT FUNCTION | FINISH

↓ PRESS [2 IN 1] KEY

62 | COPY READY

CONSOLIDATION | ARRANGEMENT | RULED LINE
NONE | 1 2 | LEFT STAPLE | NONE
2 IN 1 | | STRAIGHT LINE
4 IN 1 | 2 1 | RIGHT STAPLE | DOTTED LINE

SHORTCUT KEY REGISTRATION | RETURN TO INITIAL VALUE | CLOSE

FIG.23
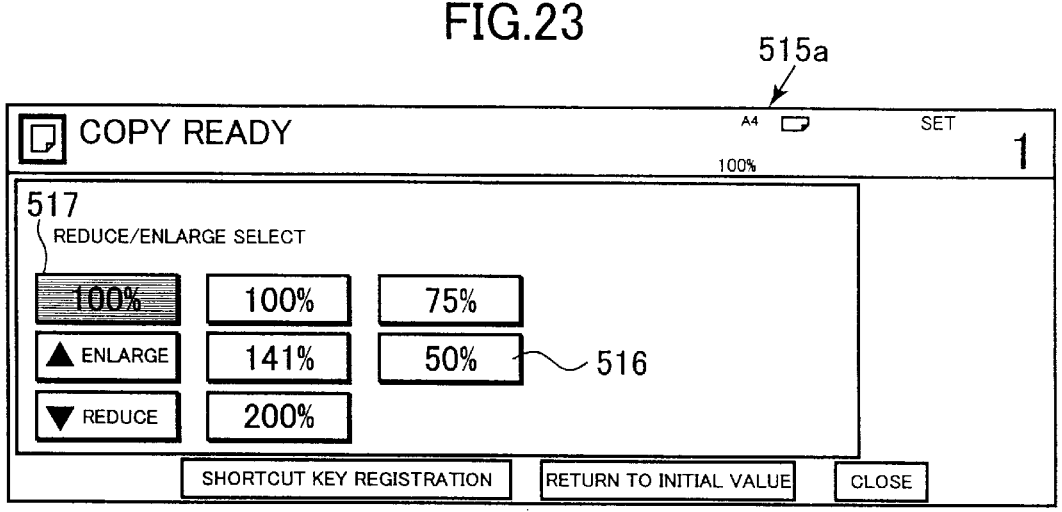
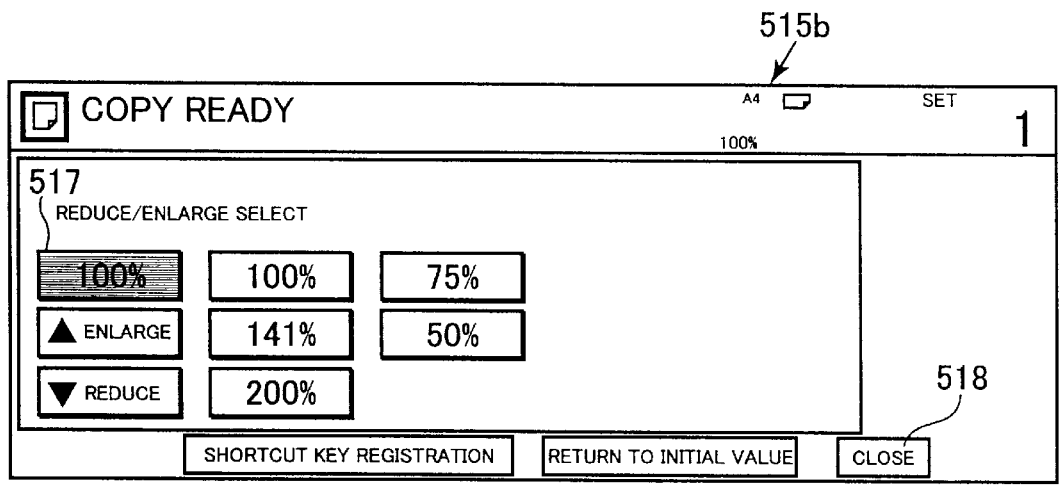
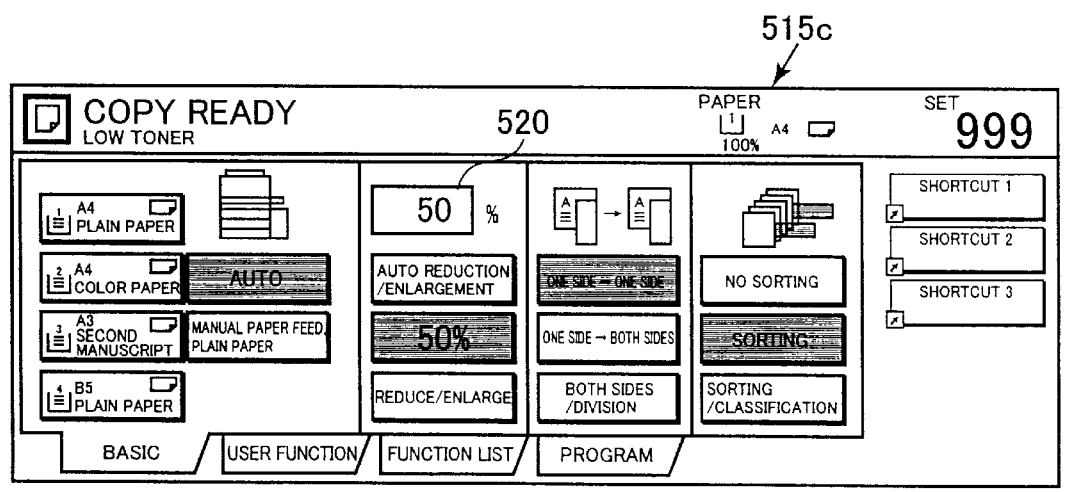

FIG.27

| DESIGNATE REGISTRATION KEY | | |
|---|---|---|
| REGISTER SHORTCUT KEY | REGISTRATION KEY | |
| CONSOLIDATION 2 IN 1 | SHORTCUT 1 | ~544 |
| LEFT STAPLE | SHORTCUT 2 | ~545 |
| DOTTED LINE | SHORTCUT 3 | ~546 |
| SHORTCUT KEY REGISTRATION | RETURN TO INITIAL VALUE | CLOSE |

OPERATING DEVICE HAVING A SHORTCUT KEY FOR SETTING FUNCTIONS

BACKGROUND OF THE INVENTION

1. Field of the Invention

The present invention generally relates to an image forming device and image reading device, and particularly relates to an operation device comprising a shortcut key capable of allocating desired functions.

2. Description of the Related Art

For example, Japanese Patent No. 3006693 discloses an operation device of a recording device for displaying preferential keys capable of allocating desired functions on a basic screen. With this operation device, a plurality of functions provided to this device are hierarchically classified into the four items of "basic," "application," "specialty" and "marker editing," respectively, and a setting screen for setting the respective functions is provided to each level. In addition to the respective function keys, the basic screen is provided with so-called "preferential keys" capable of allocating desired functions.

Moreover, for instance, upon allocating to the preferential key the "relay broadcast" function appertaining to the "specialty" item, the operator will press at the respective setting screens the "specialty" key, "specification setting" key, "registration" key, and "panel initialization" key in this order to display the screen containing the key displayed as "FAX preferential key". Further, when this "FAX preferential key" is pressed, a list of registrable functions is displayed on the display screen and, when the "relay broadcast" key is pressed, the function for the relay broadcast is allocated to the preferential key. And when the "relay broadcast" key displayed on the preferential key display area of the basic screen is operated, the display screen changes from the basic screen to a setting screen for the relay broadcast. The reduction in the number of operational steps to reach the relay broadcast screen from the basic screen is sought thereby.

Nevertheless, there is still room for the following improvements with the aforementioned conventional art.

In other words, as described above, the function for allocating the desired function to the preferential key is only provided to the only screen at the lower layer of a specific item ("specialty"), and the screen for displaying the "FAX preferential key" for giving allocation instructions is displayed by pressing the "specialty" key and the respective keys of the setting screen at the lower layer thereof, and allocation is finally possible only at such time. Therefore, even if the function to be allocated to the preferential key appertains to the "basic" key or "application" key, it is necessary to conduct allocation procedures in the item of "specialty", which made the allocation procedure complex.

Moreover, for those who are not aware that it is necessary to operate the various keys including the "specialty" key for conducting such allocation procedure would have to refer to the operation manual of the device, which would be troublesome.

In addition, although it is possible to allocate functions up to the middle layer in the "relay broadcast", for example, it is necessary to sequentially display prescribed screens on the display unit with the preferential key of the "relay broadcast" and conduct input operations with respect to functions at a further lower layer (detailed functions) of the "relay broadcast" such as the relay station ID and broadcast address. Accordingly, when nearly all of the settings of the detailed functions are determined in advance, the aforementioned setting procedure of the detailed functions must be conducted each and every time, which could be a hassle.

SUMMARY OF THE INVENTION

The present invention was devised in consideration of the aforementioned problems, and an object thereof is to improve the operability of the operation device in an image forming device and image reading device to which keys for reducing the number of operations are provided.

In order to achieve the above object, an operation device used for an image forming device or an image reading device is characterized by the following elements:

a display unit on which a plurality of function screens including a plurality of function keys to each of which a specific function is allocated and an allocation instruction key and a shortcut key display screen including a shortcut key to which an arbitrary one of said plurality of functions can be allocated;

a function setting unit for enabling an execution of an action corresponding to said functions allocated to said function key and said shortcut key when said function key or said shortcut key is selected; and a function allocating unit for allocating to said shortcut key a series of functions previously set before said function setting screen with said allocation instruction key is displayed on said display unit when said allocation instruction key is selected.

According to the present invention, as the shortcut key display screen including a shortcut key to which an arbitrary function among a plurality of functions may be allocated is displayable on the display unit, an allocation instruction key for providing instructions on allocation functions to the shortcut key is provided to the plurality of function setting screens, and, when the allocation instruction key is selected, the series of functions set before the function setting screen comprising the allocation instruction key is displayed on the display screen, as well as the function set in the function setting screen are allocated to the shortcut key, it is possible to allocate the selected function to the shortcut key. Therefore, in comparison to conventional methods where a screen for allocating functions is only provided to the sole screen at the lower layer of a prescribed item, the allocation procedure is simplified, and the operability of the operation device is improved thereby. Moreover, the operator is not required to know the method of allocating functions to the shortcut key, and, as a result, the operator will be saved from conducting troublesome procedures such as referring to the operation manual and so on. Further, it is preferable that the aforementioned allocation instruction key is displayed on every function setting screen.

These and other objects, features, and advantages of the present invention will become more apparent upon reading the following detailed description along with the accompanied drawings.

BRIEF DESCRIPTION OF THE DRAWINGS

FIG. 16 is a diagram showing an example of the screen displayed when employing the shortcut key;

FIG. 23 is a diagram showing an example of a screen for setting the details of the "reduce/enlarge" function;

FIG. 27 is a screen for designating the registration key for the shortcut key.

DESCRIPTION OF THE PREFERRED EMBODIMENTS

An operation device provided to a copying machine, which is an example of an image forming device and image reading device, will now be explained.

Figure 1:
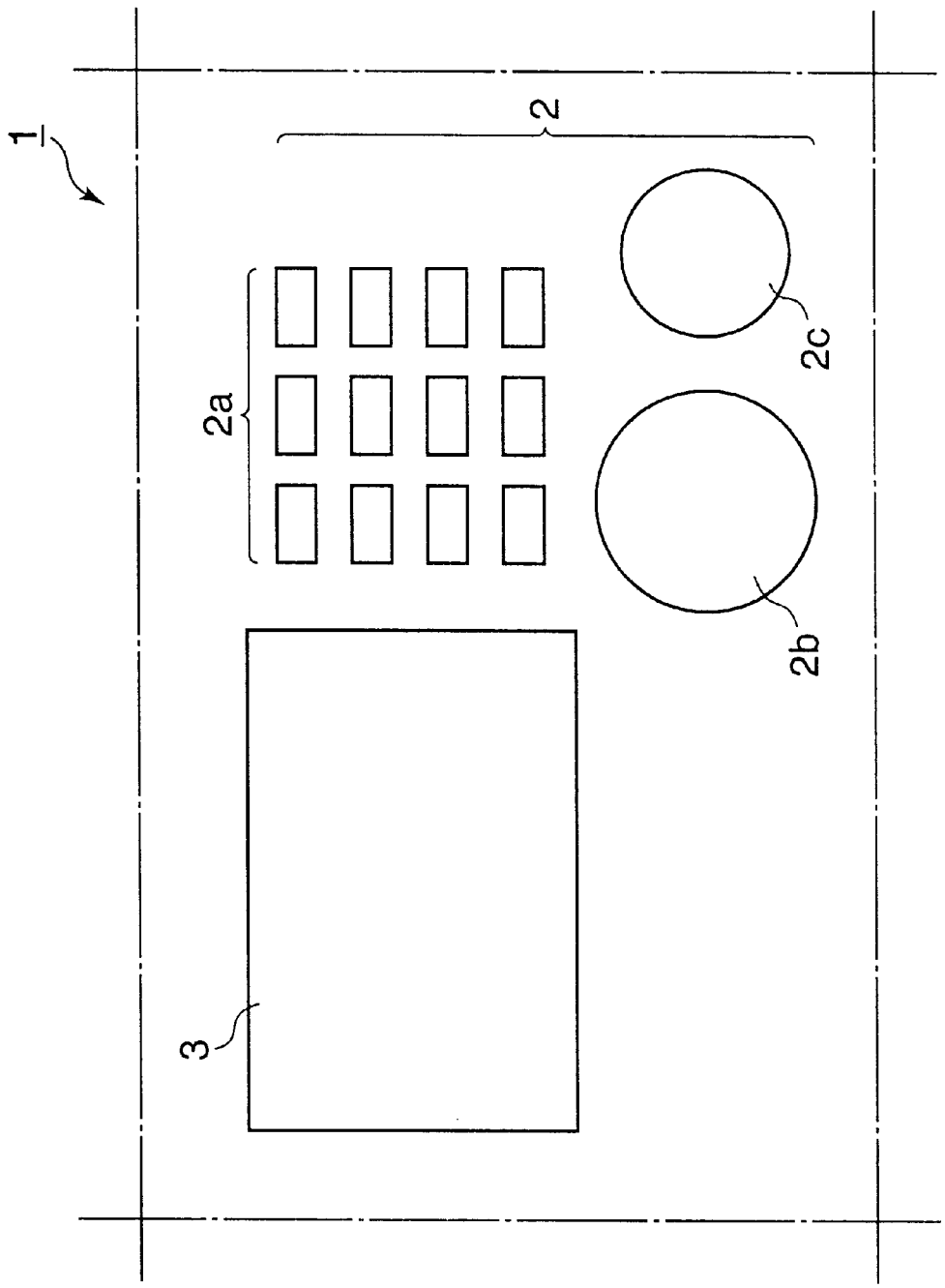
FIG. 1 is an outline of the operation device according to the present invention.

As shown in FIG. 1, the operation device 1 of the copying machine 100 (refer to FIG. 17) pertaining to the present embodiment comprises various keys 2a such as a numeric keypad, an operation unit 2 comprising a start button 2b and a stop button 2c, and a display unit 3 positioned on the left side of the operation unit 2. Although not shown, the display unit 3 comprises a touch panel and an LCD disposed at the backend thereof for conducting liquid crystal display. The copying machine 100 is capable of copying documents under desired conditions by the operator touching the keys displayed on the panel surface of the touch panel or operating the operation unit 2.

The operation device 1 is provided with a plurality of executable functions, and the respective functions are classified into a function for setting the size of the transfer paper and reduction/enlargement ratio of copying (these functions are hereinafter referred to as the basic function), a function for setting the output mode to the transfer paper and output darkness (these functions are hereinafter referred to as the edit function), and a function for preparing output setting for each set of documents or stapling such set documents (these documents are hereinafter referred to as the finish function).

Figure 2:
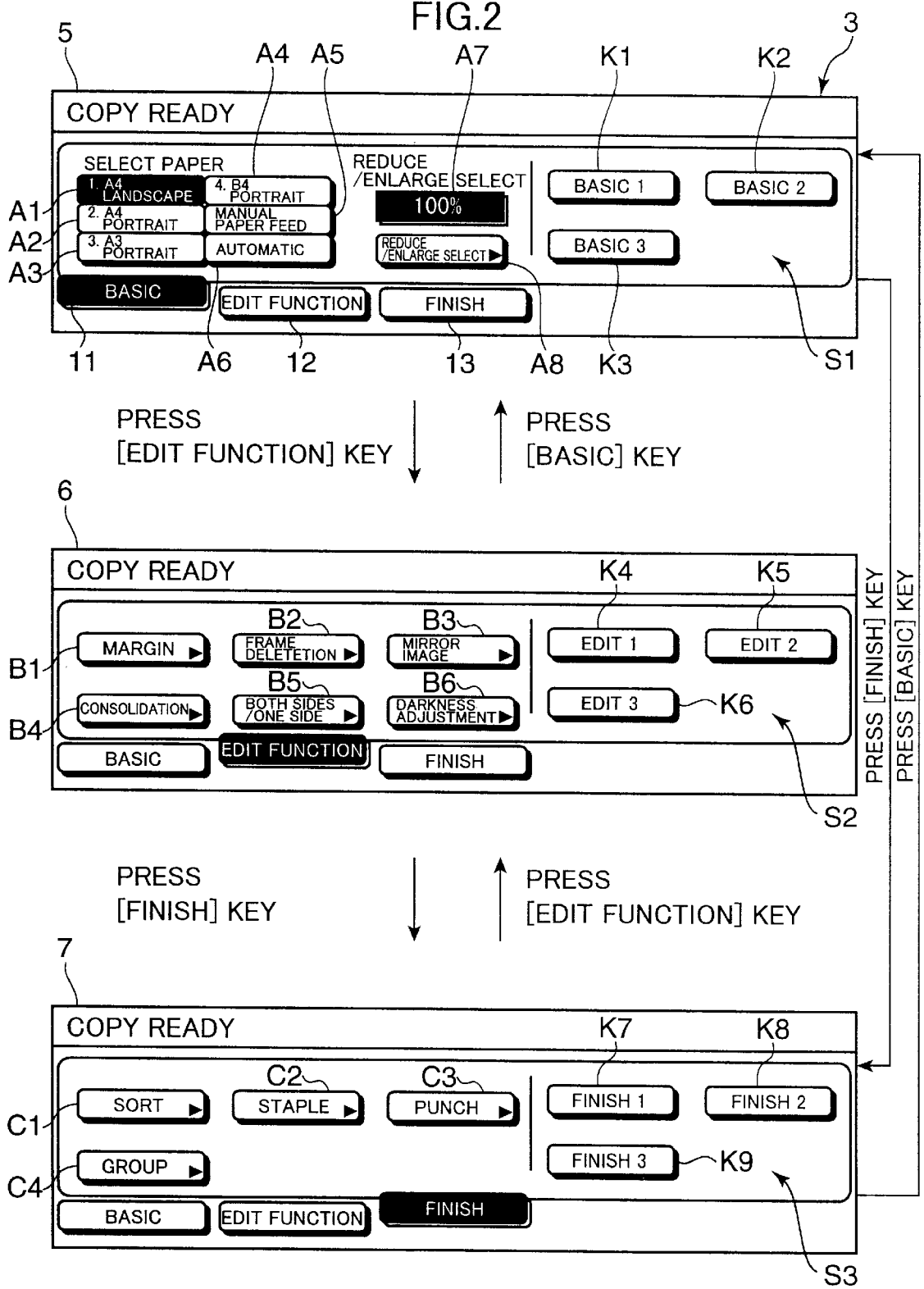
FIG. 2 is a diagram showing the display screen of the respective items.

As shown in FIG. 2, a basic screen 5 is displayed on the display unit 3 immediately after the power of the copying machine 100 is turned on, and displayed on this basic screen 5 are a "basic" key 11, "edit function" key 12, and "finish" key 13 (these keys are hereinafter collectively referred to as item keys).

The respective item keys 11~13 are coordinated with the respective item setting screens 5~7 shown in FIG. 2. In other words, the respective item keys 11~13 are displayed on the respective item setting screens 5~7, and displayed on the display unit 3 are the "basic screen" 5 when the "basic" key 11 is pressed, the "edit function screen" 6 when the "edit function" key 12 is pressed, and the "finish screen" 7 when the "finish" key 13 is pressed. The basic screen 5 is a screen for selecting functions appertaining to the aforementioned basic functions, the edit function screen 6 is a screen for selecting functions appertaining to the aforementioned editing functions, and the finish screen 7 is a screen for selecting the functions appertaining to the aforementioned finishing functions.

A list of functions appertaining to the relevant item is displayed on the respective item setting screens 5~7. In other words, select paper keys such as the "A4 landscape" key A1, "A4 portrait" key A2, "A3 portrait" key A3, "B4 portrait" key A4, "manual paper feed" key A5 and "automatic" key A6 (these keys are hereinafter collectively referred to as select paper keys), selected magnification display unit A7 for displaying the value of the selected magnification ratio, and a "magnification selection" key A8 for selecting the copying reduction/enlargement ratio are displayed at the left area of the basic screen 5, which is the upward part of the item keys 11~13, and the paper size to be copied, the orientation and magnification ratio thereof are selected by the operator pressing these keys A1~A6 and A8.

Displayed at the left area of the edit function screen 6 are a "margin" key B1, "frame deletion" key B2, "mirror image" key B3, "consolidation" key B4, "both sides/one side" key B5, "darkness adjustment" key B6, and functions such as "margin" and "frame deletion" are selected by the operator pressing the keys B1~B6.

Displayed at the left area of the finish screen 7 are a "sort" key C1, "staple" key C2, "punch" key C3, "group" key C4, and functions such as "sort" and "staple" are set by the operator pressing the keys C1~C4.

A screen for setting detailed functions is provided hierarchically to the respective functions (hereinafter referred to as the function setting screen), and, when a desired key is pressed in the item setting screens 5~7, a function setting screen corresponding to such key is displayed.

Figure 3:
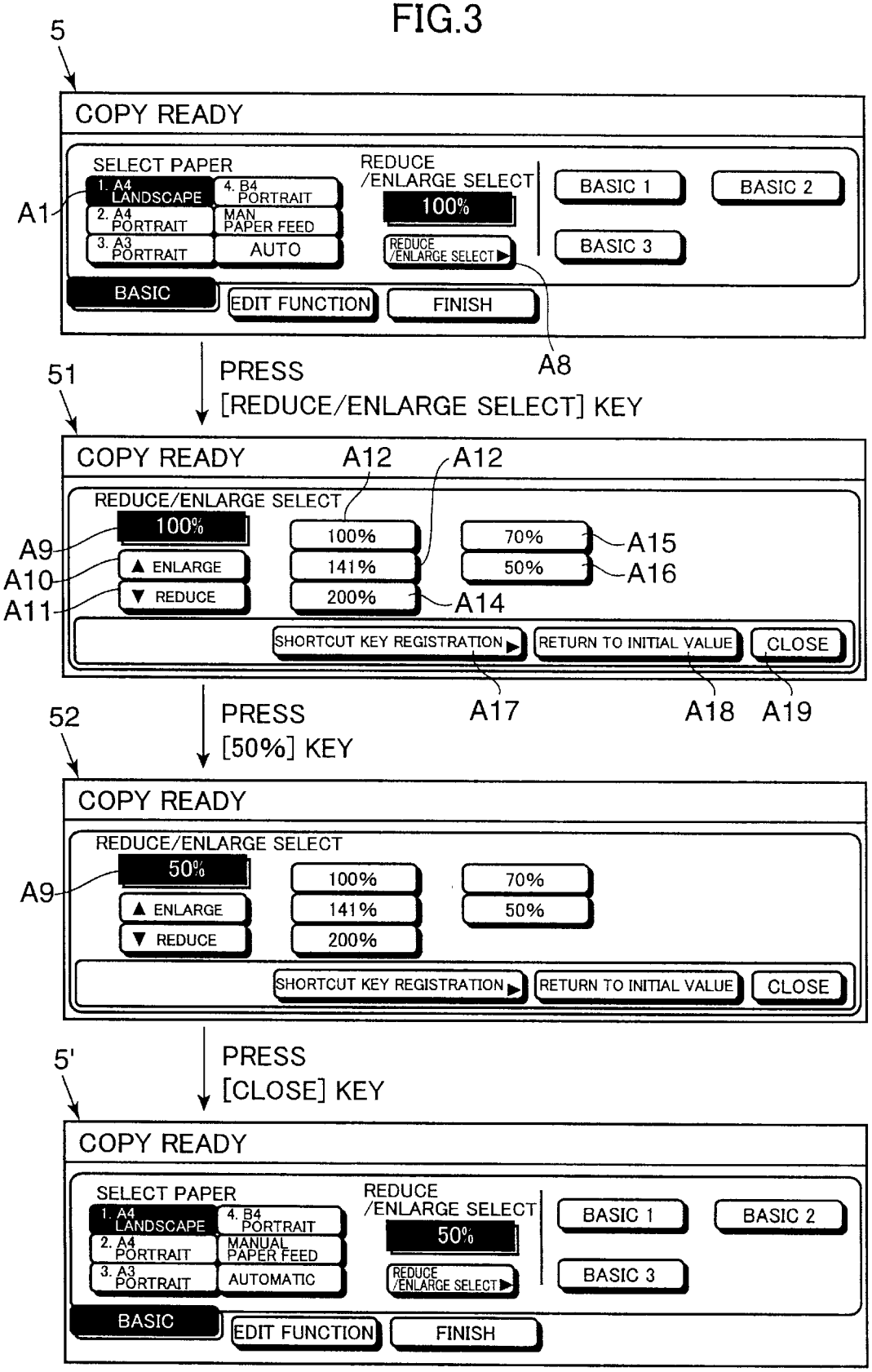
FIG. 3 is a diagram showing an example of a function setting screen in the basic function.

For example, as shown in FIG. 3, when the "A4 landscape" key A1 and "magnification selection" key A8 are pressed, the screen is switched to the function setting screen 51. Displayed on this screen 51 are a selected magnification display unit A9 for displaying the set magnification, an "enlargement" key A10 as a function key, a "reduction" key A11, a "100%" key A12, a "141%" key A13, a "200%" key A14, a "70%" key A15 and a "50%" key A16, and a "shortcut key registration" key A17, a "return to initial value" key A18 and a "close" key A19 are also displayed thereunder.

In this screen 51, for instance, when the "50%" key A16 is pressed, it becomes a screen 52, which displays "50%" on the selected magnification display unit A9. When the "close" key A19 is pressed in this screen 52, the setting of the size and orientation of the transfer paper as well as the copying magnification is completed, and becomes a screen 5' wherein the text of "50%" is displayed with the black and white being inverted on the selected magnification display unit A9 in screen 5. Then, copying is conducted under the aforementioned settings pursuant to the operation of the start button 2b. Further, when a function key other than the "A4 landscape" key and the magnification key A8 is pressed, similar to the above, the function setting screen in the respective functions is also displayed.

Figure 4:
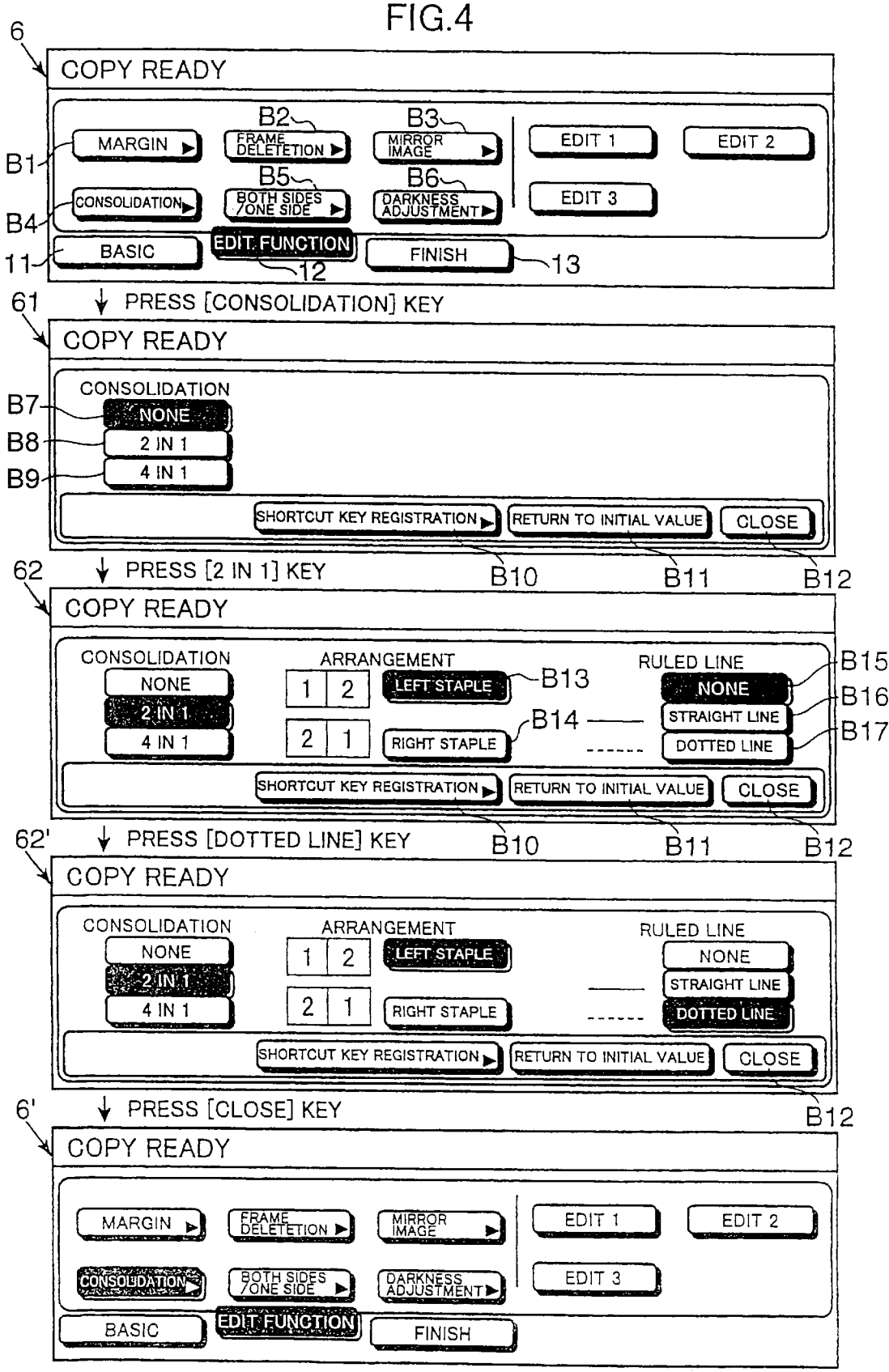
FIG. 4 is a diagram showing an example of a function setting screen in the edit function.

Moreover, as shown in FIG. 4, for example, when the "consolidation" key B4 is pressed in the edit function screen 6, the screen switches to the first function setting screen 61. Displayed on this screen 61 are function keys such as the "none" key B7, "2 in 1" key B8 and "4 in 1" key B9, and a "shortcut key registration" key B10, a "return to initial value" key B11 and a "close" key B12 are also displayed thereunder.

In this screen 61, for instance, when the "2 in 1" key B8 is pressed, it switches to a second function setting screen 62 to which are displayed, in addition to the respective keys B7~B9, function keys such as the "left staple" key B13, "right staple" key B14, "none" key B15, "straight line" key B16, and "dotted line" key B17. In this screen 62, when the "left staple" key B13 and "dotted line" key B17 are further pressed, it becomes a screen 62' in which the functions keys of "2 in 1" key B8, "left staple" key B13 and "dotted line" key B17 are displayed with the black and white being inverted. Thereafter, when the "close" key B12 is pressed, the setting of detailed functions regarding the "consolidation" function is completed, the screen becomes a screen 6' in which the "consolidation" key B4 in screen 6 is displayed with the black and white being inverted, and, by pressing the start button 2b, the copying operation is performed according to the settings as described in the above. When a key other than the "consolidation" key is pressed, similar to the above, a function setting screen in the respective functions is displayed.

Figure 5:
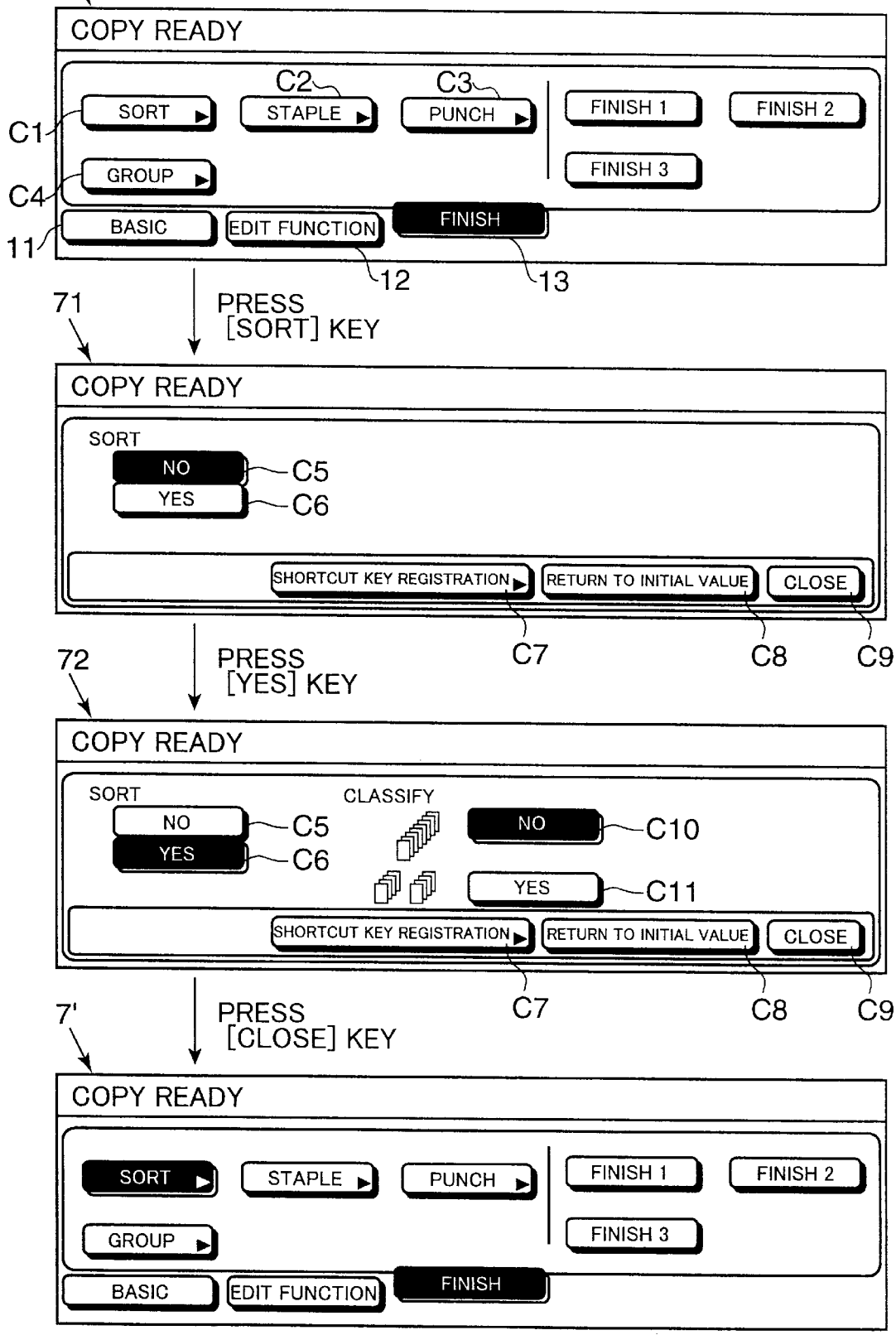
FIG. 5 is a diagram showing an example of a function setting screen in the finish function.

Moreover, as shown in FIG. 5, for instance, when "yes" key C6 is pressed in the finish screen 7, the screen switches to the first function setting screen 71. Displayed on this screen 71 are function keys such as the "no" key C5 and "yes" key C6, and a "shortcut key registration" key C7, a "return to initial value" key C8 and a "close" key C9 are also displayed thereunder.

In this screen 71, for instance, when the "sort" key C1 is pressed, it switches to a second function setting screen 72 to which are displayed, in addition to the respective keys C5 and C6, function keys such as the "no" key C10 and "yes" key C11 regarding "sorting". In this screen 72, for example, when the "no" key C10 is pressed and the "close" key C9 is also pressed thereafter, the setting of detailed functions regarding the "sort" function is completed, and the screen becomes a screen 7' in which the "sort" key C1 in screen 7 is displayed with the black and white being inverted. Further, by pressing the start button 2b, copying is conducted with the aforementioned setting. Moreover, when a key other than the "sort" key is pressed, similar to the above, a function setting screen in the respective functions is displayed.

As described above, the setting of the respective functions is a troublesome effort as it is necessary to press each key several times in order to make the copying machine 100 conduct copying.

Thus, the operation device 1 is structured so as to be capable of allocating settings of the respective detailed functions to prescribed keys (hereinafter referred to as shortcut keys) in order to reduce the number of operations of the keys as described above.

As shown in FIG. 2, shortcut key display units S1~S3 for displaying shortcut keys K1~K9 which are provided for reducing the number of operations of the respective keys are provided to the right-side area of the respective screens 5~7 upon copying with detailed functions and the like. Up to three types of shortcut keys are respectively displayable on the shortcut key display units S1~S3 of the respective screens 5~7. Until functions and the like are allocated to the respective shortcut keys, texts such as "basic 1" . . . , "edit 1". . . , "finish 1". . . are displayed on keys K1~K9, and, when the functions are allocated to the shortcut keys, the function name is displayed in place of such texts.

In addition to the above, for instance, "shortcut key registration" keys A17, B10, C7 for allocating functions to shortcut keys K1~K9 are provided to the respective function setting screens of screens 51 and 52 of FIG. 3, screens 61, 62 and 62' of FIG. 4, and screens 71 and 72 of FIG. 5.

Now explained is the operation of allocating functions and the like to the aforementioned shortcut keys K1~K9 by utilizing these "shortcut key registration" keys A17, B10, C7.

Figure 6:
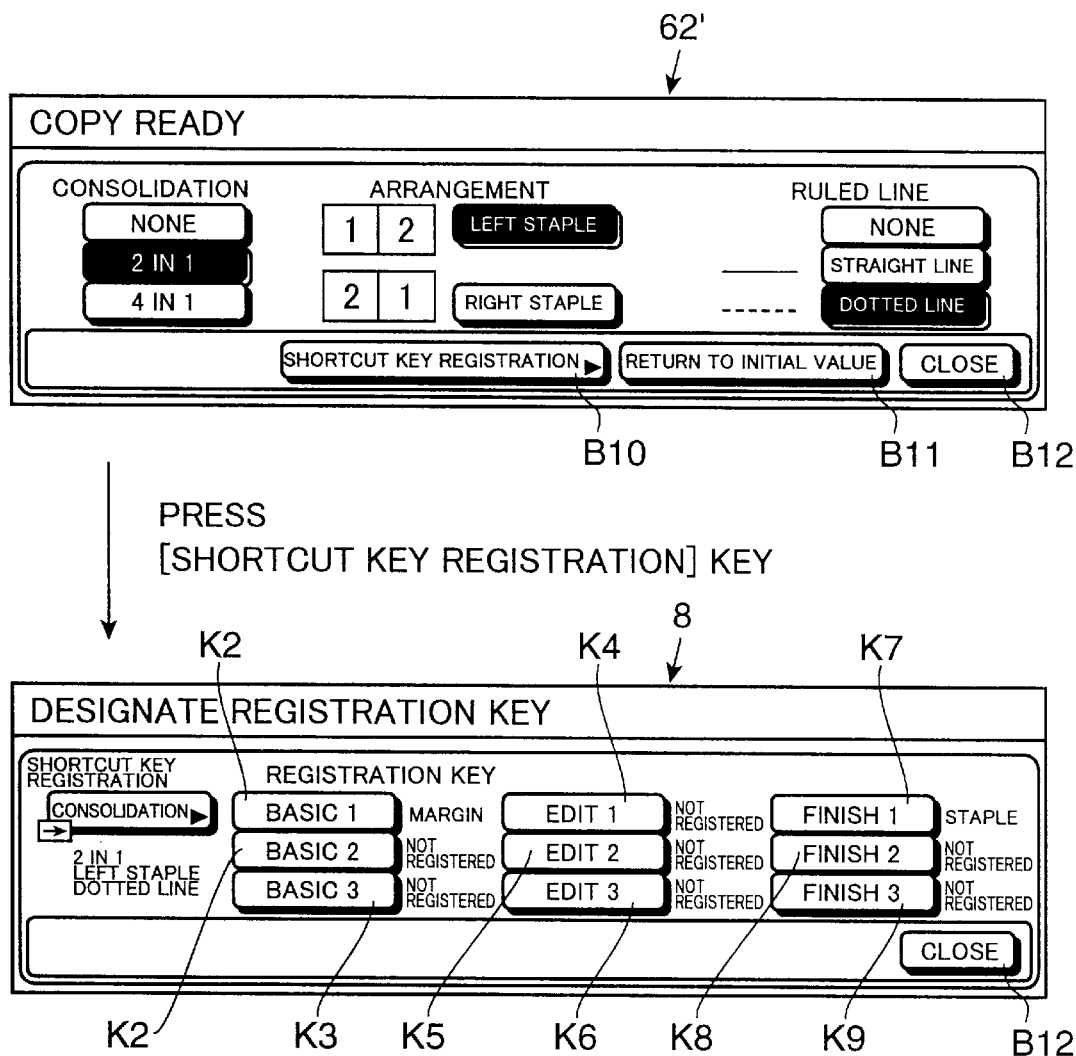
FIG. 6 is a diagram showing the shortcut key selection screen.

As with screen 62' of FIG. 4, when the "shortcut key registration" key B10 is pressed after the respective functions have been set to desired settings, as shown in FIG. 6, the screen is switched to a shortcut key selection screen 8 for selecting the shortcut key to which the aforementioned settings are allocated. The operator will select in this shortcut key selection screen 8 the shortcut key to be allocated among the "basic 1" key K1, . . . , "edit 1" key K4, . . . , "finish 1" key K7, . . . of the shortcut key display areas S1~S3 in screens 5~7.

The screen 8 in FIG. 6 represents that the "margin" function, which is one of the editing functions, is allocated to the "basic 1" key K1, that the "staple" function, which is one of the finishing functions, is allocated to the "finish 1" key K7, and that no functions have been allocated to keys K2~K6, K8 and K9. Thus, in this case, the operator will select an allocation key among the keys K2~K6, K8 and K9.

Here, for instance, functions and the like to be allocated to the shortcut keys K1~K3 of the basic screen 5 may be allocated even if they do not appertain to the basic function; that is, even when they appertain to the editing function or finishing function. In other words, functions appertaining to other items may be allocated to the shortcut keys K1~K9 of the respective item display screens 5~7. By enabling the allocation of functions beyond the scope of items, for example, it will be possible to collectively display on a single screen the respective shortcut keys of the plurality of functions to be used simultaneously, or, when every shortcut key on a certain item display screen is registered, it will be possible to register the function on a shortcut key of a different item display screen. The operability of the copying machine 100 will be improved thereby.

The case of allocating a function to the "basic 2" key K2 in the screen 8 of FIG. 6 is now explained. Upon pressing the "basic 2" key K2, the screen switches to the name input screen G1 shown in FIG. 7. Displayed on this name input screen G1 are a "input from name list" key S1, "input icon" key S2, "free name input from keyboard" key S3, "input icon, input from name list" key S4, and "input icon, free name input from keyboard" key S5.

Figure 8:
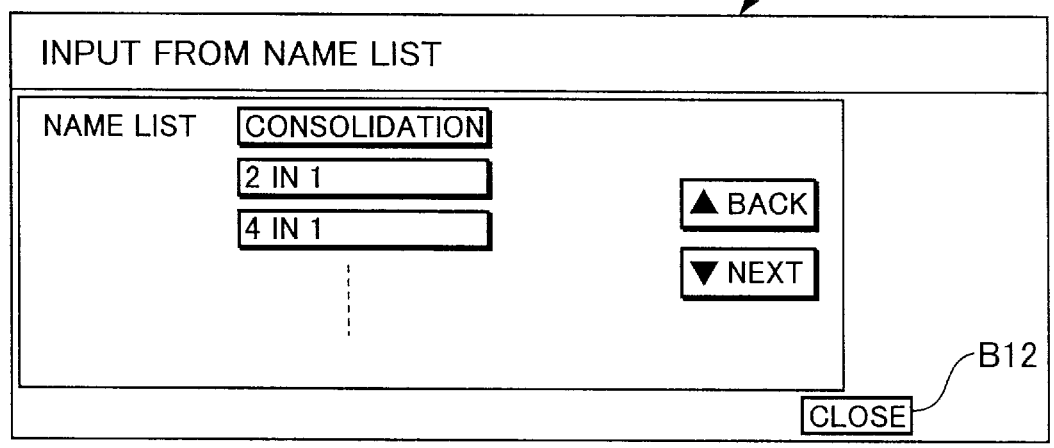
FIG. 8 is a diagram showing the name selection screen.
Figure 9:
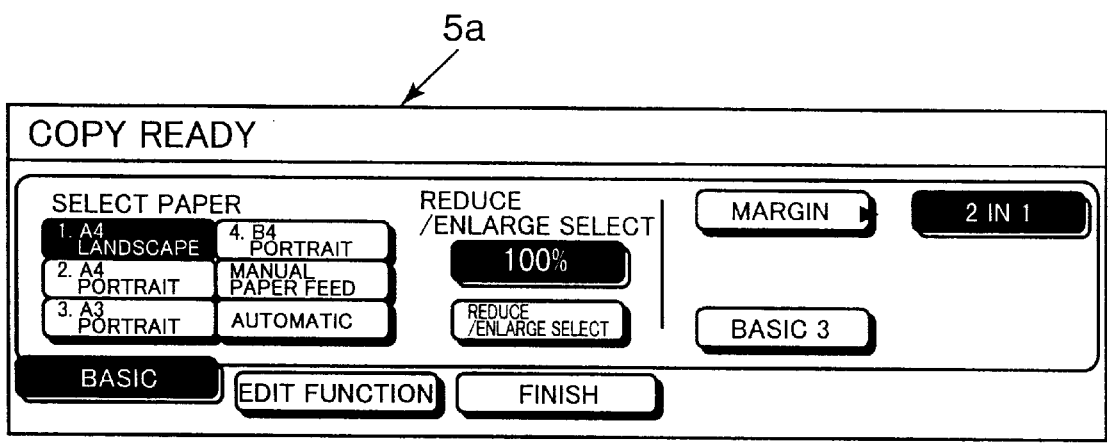
FIG. 9 is a diagram showing the basic screen including the shortcut key after having allocated the functions.

Among the above, when the "input from name list" key S1 is pressed, as it becomes a name selection screen G2 as shown in FIG. 8, the operator selects an appropriate name corresponding to the function to be allocated to the "basic 2" key K2 from the name list of the name list selection screen G2, and, by thereafter pressing the "close" key B12, completes the allocation of consolidation functions with the settings of the "basic 2" key K2 being "2 in 1", "left staple" and "dotted line". Further, as shown in FIG. 9, displayed is a screen 5a which displays the selected name "2 in 1" in which the black and white are inverted on the "basic 2" key K2.

Figure 7:
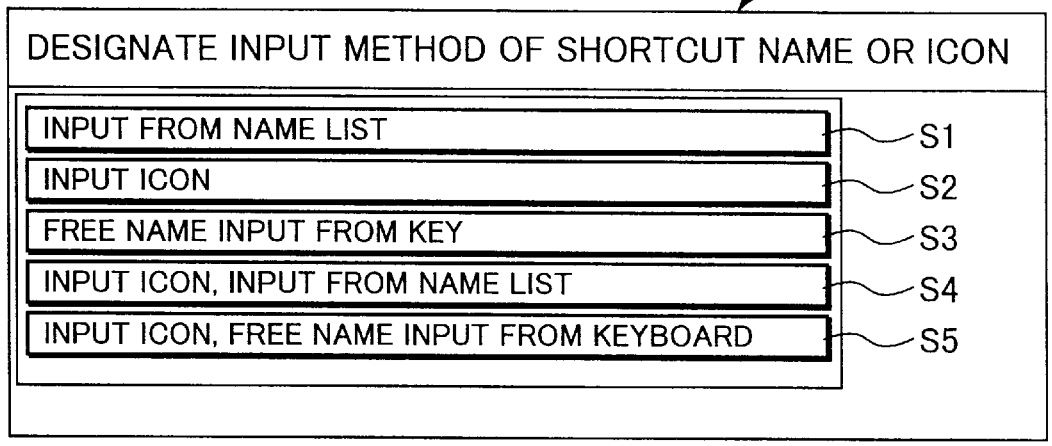
FIG. 7 is a diagram showing the name input screen.
Figure 10:
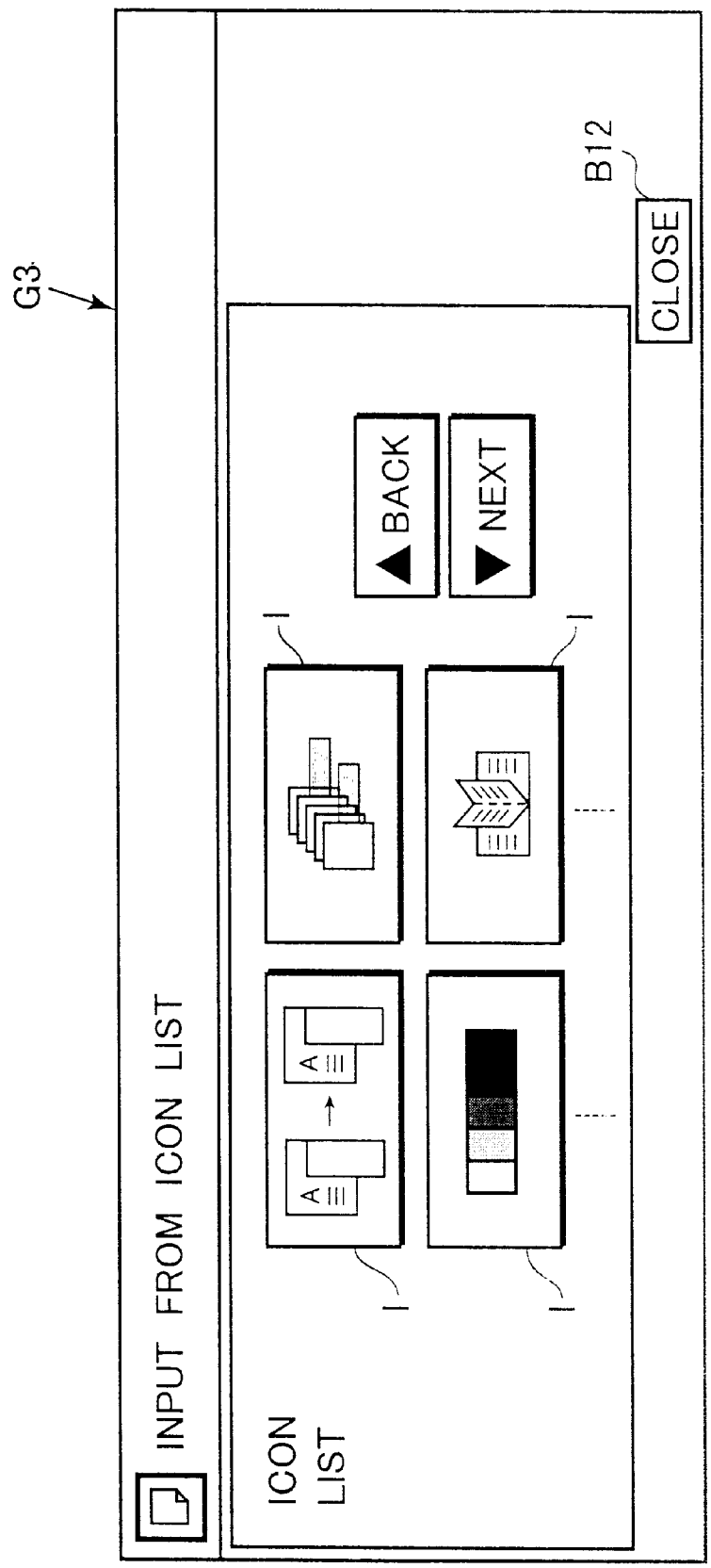
FIG. 10 is a diagram showing the icon selection screen.
Figure 11:
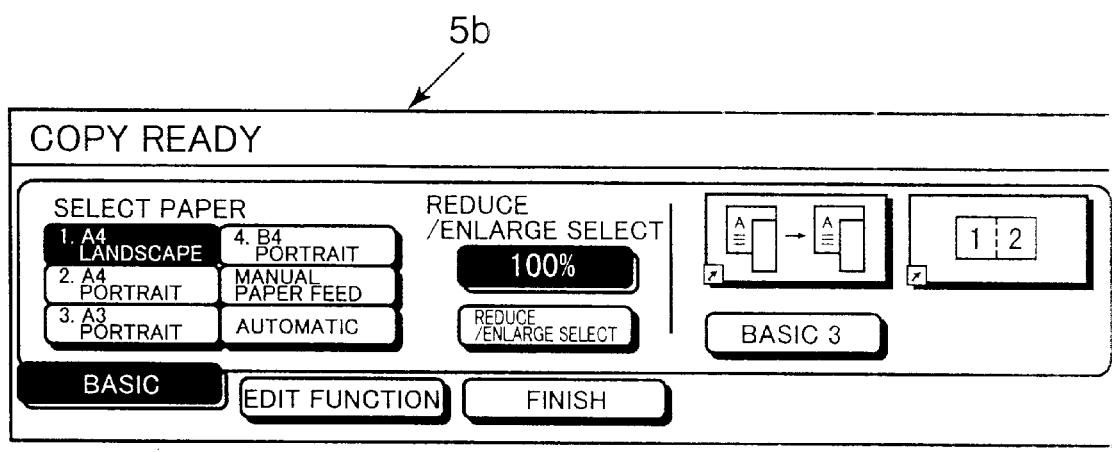
FIG. 11 is a diagram showing the basic screen including the shortcut key after having allocated the functions.

Meanwhile, in the name input screen G1 of FIG. 7, when the "input icon" key S2 is pressed, as it becomes an icon selection screen G3 as shown in FIG. 10, the operator selects an appropriate icon I corresponding to the function to be allocated to the "basic 2" key K2 from the icon list of the icon list selection screen G3, and, by thereafter pressing the "close" key B12, completes the allocation of consolidation functions with the settings of the "basic 2" key K2 being "2 in 1", "left staple" and "dotted line". Further, as shown in FIG. 11, displayed is a screen 5b which displays the selected icon I on the "basic 2" key K2.

Figure 12:
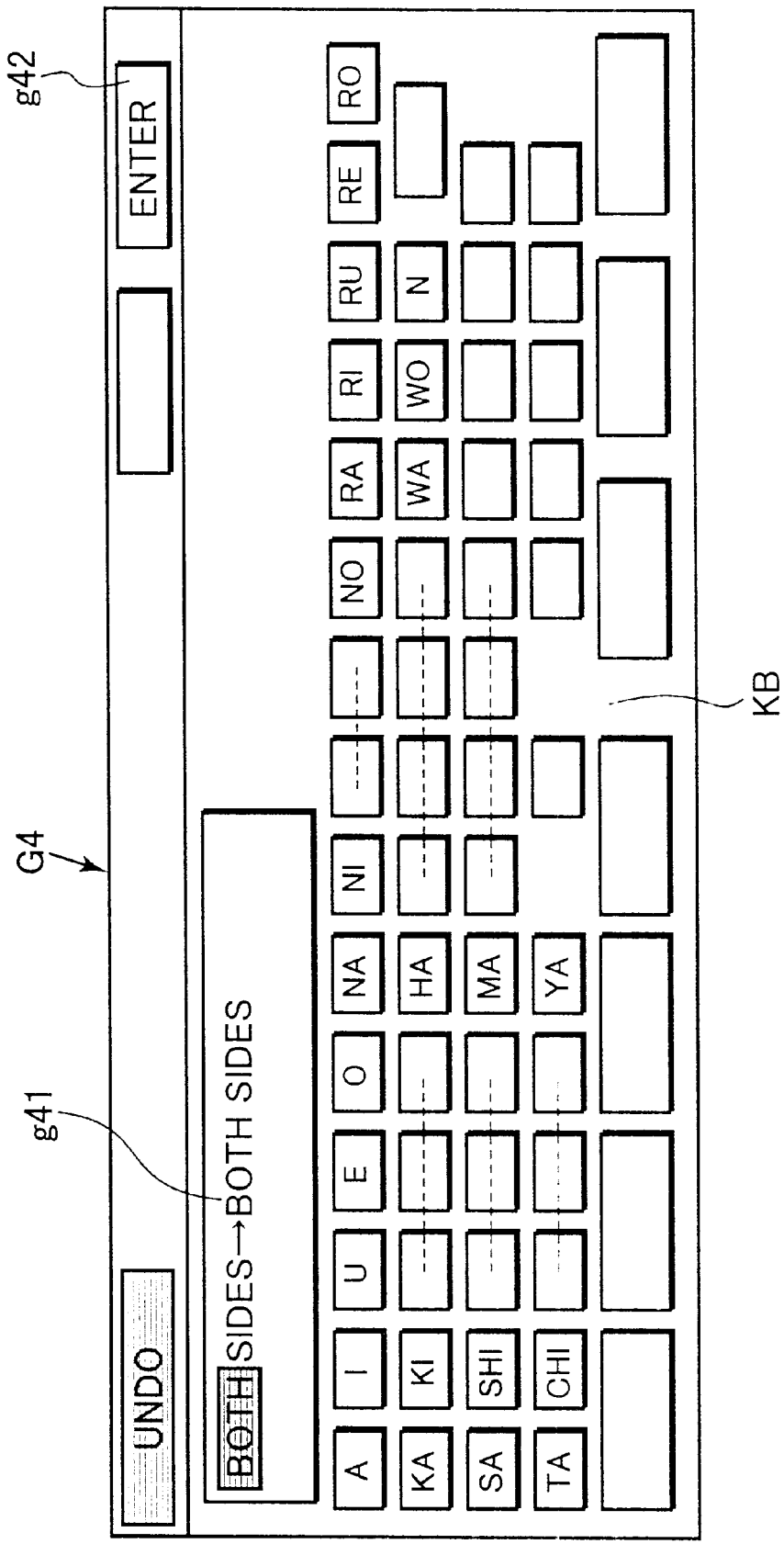
FIG. 12 is a diagram showing the text input screen.
Figure 13:
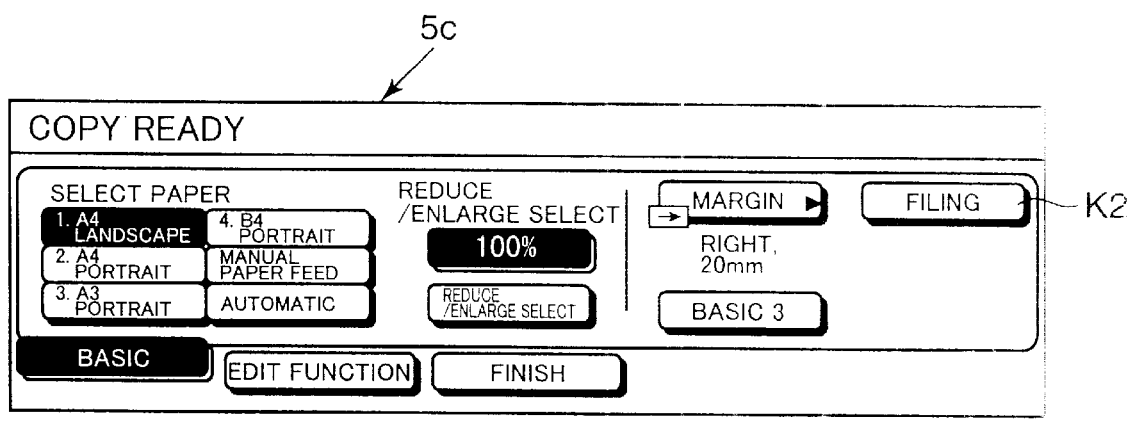
FIG. 13 is a diagram showing the basic screen including the shortcut key after having allocated the functions.

Moreover, in the name input screen G1 of FIG. 7, when the "free name input from keyboard" key S3 is pressed, as it becomes a text input screen G4 as shown in FIG. 12, the operator inputs a desired name to the text display unit g41 of the text input screen G4 by using the keyboard KB of such text input screen G4, and, by thereafter pressing the "enter" key g42, completes the allocation of consolidation functions with the settings of the "basic 2" key K2 being "2 in 1", "left staple" and "dotted line". Further, as shown in FIG. 13, displayed is a screen 5c which displays a free name such as "filing" on the "basic 2" key K2.

Figure 14:
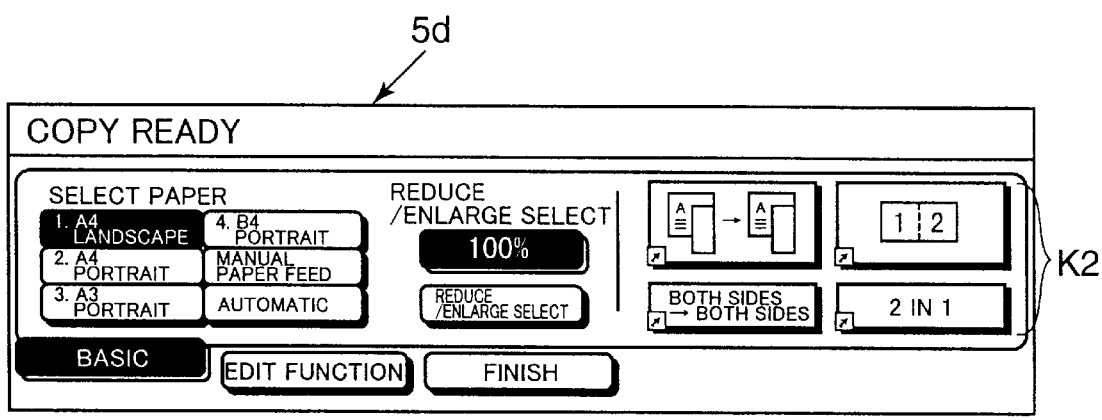
FIG. 14 is a diagram showing the basic screen including the shortcut key after having allocated the functions.

Furthermore, in the name input screen G1 of FIG. 7, when the "input icon, input from name list" key S4 is pressed, as it becomes an icon selection screen G3 as shown in FIG. 10, the operator selects an appropriate icon I from the icon list of the icon list selection screen G3, and, by thereafter pressing the "close" key B12, displayed is a name selection screen G2 as shown in FIG. 8. Thus, by pressing the "close" key B12 after having selected a desired name from the name list of the name selection screen G2, the operator is able to complete the allocation of consolidation functions with the settings of the "basic 2" key K2 being "2 in 1", "left staple" and "dotted line". Further, as shown in FIG. 14, displayed is a screen 5d which displays the selected name "2 in 1" on the "basic 2" key K2 and an icon I above such name in two rows. Moreover, upon displaying both the icon and name on the shortcut key, it is possible to set only two shortcut keys in light of the limitation of the display space of the basic screen 5.

Figure 15:
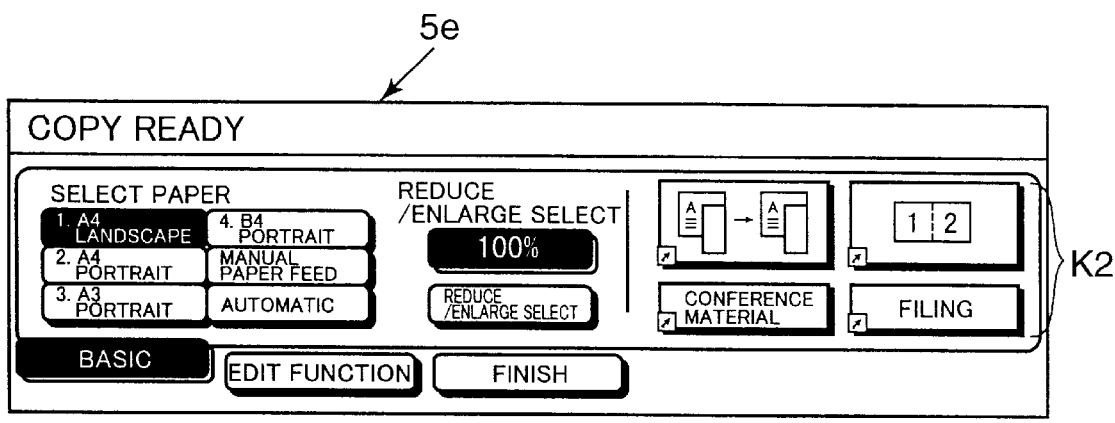
FIG. 15 is a diagram showing the basic screen including the shortcut key after having allocated the functions.

Additionally, in the name input screen G1 of FIG. 7, when the "input icon, free name input from keyboard" key S5 is pressed, as it becomes an icon selection screen G3 as shown in FIG. 10, the operator selects a desired icon I from the icon list of the icon selection screen G3, and, by thereafter pressing the "close" key B12, the screen switches to the text input screen G4 as shown in FIG. 12. Thus, by pressing the "enter" key g42 after having input the desired name on the text display unit g41 of the text input screen G4 by utilizing the keyboard KB of this text input screen G4, the operator completes the allocation of consolidation functions with the settings of the "basic 2" key K2 being "2 in 1", "left staple" and "dotted line". Further, as shown in FIG. 15, displayed is a screen 5e which displays a free name such as "filing" on the "basic 2" key K2 and the selected icon I above such name in two rows. Moreover, similar to the above, upon displaying both the icon and name on the shortcut key, it is possible to set only two shortcut keys in light of the limitation of the display space of the basic screen 5.

Further, upon displaying the pre-prepared name list or icon on the "basic 2" key K2, the "basic 2" key K2 in the shortcut key selection screen 8 may be pressed, and, when the allocation of the selected functions (consolidation function for setting "2 in 1", "left staple, "dotted line") is completed, it is thereby possible to automatically display the name or icon corresponding to the selected function on the shortcut key. This will lessen the operator's workload, thereby simplifying the setting and registration procedures of shortcut keys.

Thus, as shown in FIG. 16, in the basic screen 5 in which functions have been allocated, when the shortcut key K2 on which is displayed the text of "2 in 1" is pressed, for example, displayed will be screen 62' leapfrogging the screens 6, 61 and 62 shown in FIG. 4, and, pursuant to the operation of the start button 2b, copying is conducted with the aforementioned setting. Further, the "return to initial value" keys A18, B11, C8 of screens 61 and so on of FIG. 4 are keys for returning the settings of the respective detailed functions to their prior set initial values.

As described above, in the present operation device 1, the aforementioned "shortcut key registration" key is provided to the respective function setting screens of each function. Thus, for instance, when the "shortcut key registration" key A17 is pressed in screen 51 of FIG. 3, the contents selected and set theretofore; that is, the setting of the paper size and orientation "A4 landscape" at a magnification ratio of "100%" may be allocated to any one of keys K1~K9. Further, for example, when the "shortcut key registration" key A17 is pressed in screen 52 of FIG. 3, the aforementioned setting of "A4 landscape" regarding the size and orientation of the paper, and the amended setting of magnification ratio of "50%" may be allocated to any one of keys K1~K9.

Thereby, in the respective function setting screens, as it is possible to allocate the selected and set functions prior to such screen being displayed as well as the functions set in such screen to shortcut keys, in comparison to the case where the screen for allocating functions is only provided at the lower layer of the prescribed item, it is possible to improve the operability of the copying machine 100 as the allocation procedure is simplified.

Figure 17:
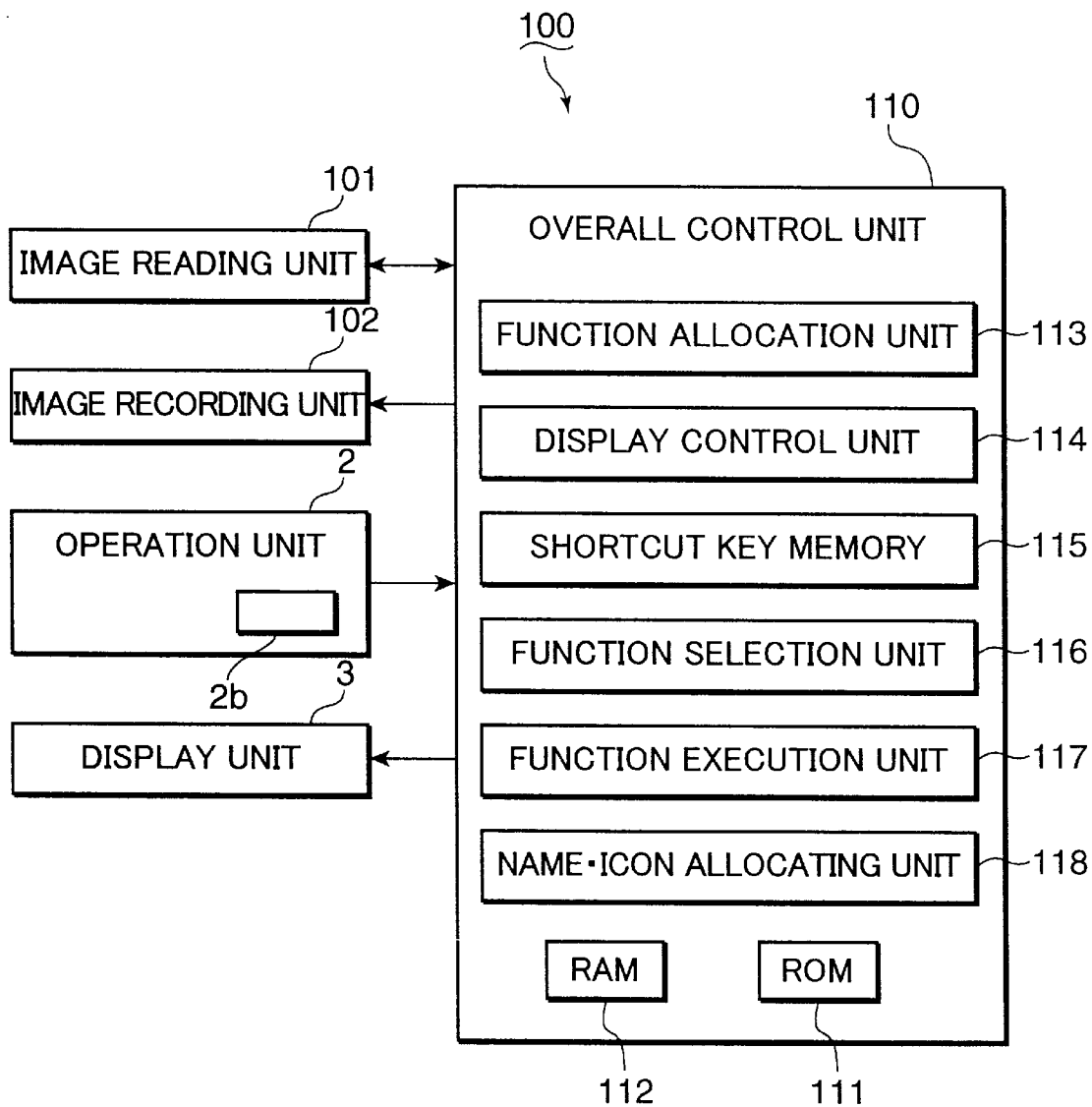
FIG. 17 is a diagram showing the control block structure of the copying machine.

FIG. 17 is a diagram showing an example of the control block structure of the copying machine 100.

As shown in FIG. 17, the copying machine 100 comprises an image reading unit 101, an image recording unit 102, an operation unit 2, a display unit 3 and an overall control unit 110.

The image reading unit 101 is for reading the manuscript to be copied. The image reading unit 101 comprises an auto manuscript feeder for automatically feeding the set manuscript, and an imaging unit and image processing unit structured of a CCD (Charge Coupled Device) line image sensor, automatically feeds the manuscript such that the imaging unit relatively scans the manuscript face and converts and incorporates such manuscript into image signals in line units, performs prescribed signal processing (level correction, β correction, A/D conversion, etc.) to such image signals, and sequentially outputs this to the overall control unit 110.

The image recording unit 102 is for recording the image data read with the image reading unit 101 on to recording paper. The image recording unit 102 is structured of a laser printer, for example, and forms an electrostatic latent image of the image formed of the image data to a photo conductor surface by irradiating such photo conductor with laser modulated with the image data, elicits such latent image by electrostatically applying a toner, and forms an image by transferring this elicited image on paper.

The operation unit 2 is for conducting various input operations (setting of various modes and conditions) for copy processing of image data by the copying machine 100.

The display unit 3 is structured of an LCD (Liquid Crystal Display) and is for displaying with such LCD the various screens and the like described above.

The overall control unit 110 is structured of a microcomputer, and controls the copy functions of the copying machine 100 by controlling the operations of the aforementioned units 101, 102 and 3. Further, the overall control unit 110 comprises a ROM (Read Only Memory) 111 which stores programs and the like of various functions provided to the copying machine 100, and a RAM (Random Access Memory) 112 for conducting prescribed operation processing in accordance with such programs.

Moreover, the overall control unit 110, in addition to the ROM 111 and RAM 112, comprises a function allocation unit 113, a display control unit 114, a shortcut memory 115, a function selection unit 116, a function execution unit 117 and a name/icon allocation unit 118 for conducting the aforementioned function allocation processing.

The function allocation unit 113 is for allocating the settings of the functions and detailed functions input with the aforementioned function keys and the like to the shortcut keys upon receiving operation signals of the shortcut key registration key and the shortcut key selected in the shortcut key selection screen 8.

The display control unit 114 is for displaying on the display unit 3 the item display screens and function setting screens and the like with "shortcut key registration" keys A17, B10, C7 in response to the operation of the various function keys described above by the operator.

The shortcut key memory 115 is for correspondingly storing the allocated shortcut keys and the set functions. The display screen of the display unit 3 has a setting of a two-dimensional coordinate system, and the shortcut key memory 115 correspondingly stores the data of the coordinate area occupied by the respective shortcut keys in the aforementioned item display screens 5~7 and the set functions and the like.

The function selection unit 116 is for reading the corresponding function from the data stored in the shortcut key memory 115 based on the coordinate are of this shortcut key when the allocated shortcut key is operated in the item display screen.

The function execution unit 117 is for executing the copying operation of the image reading unit 101 and image recording unit 102 with the functions read by the aforementioned function selection unit 116.

The name/icon allocation unit 118 is for allocating the name or icon selected with the name input screen or icon selection screen to the corresponding shortcut key, and is also for allocating the name input from the keyboard of the text input screen to the corresponding shortcut key.

Figure 18:
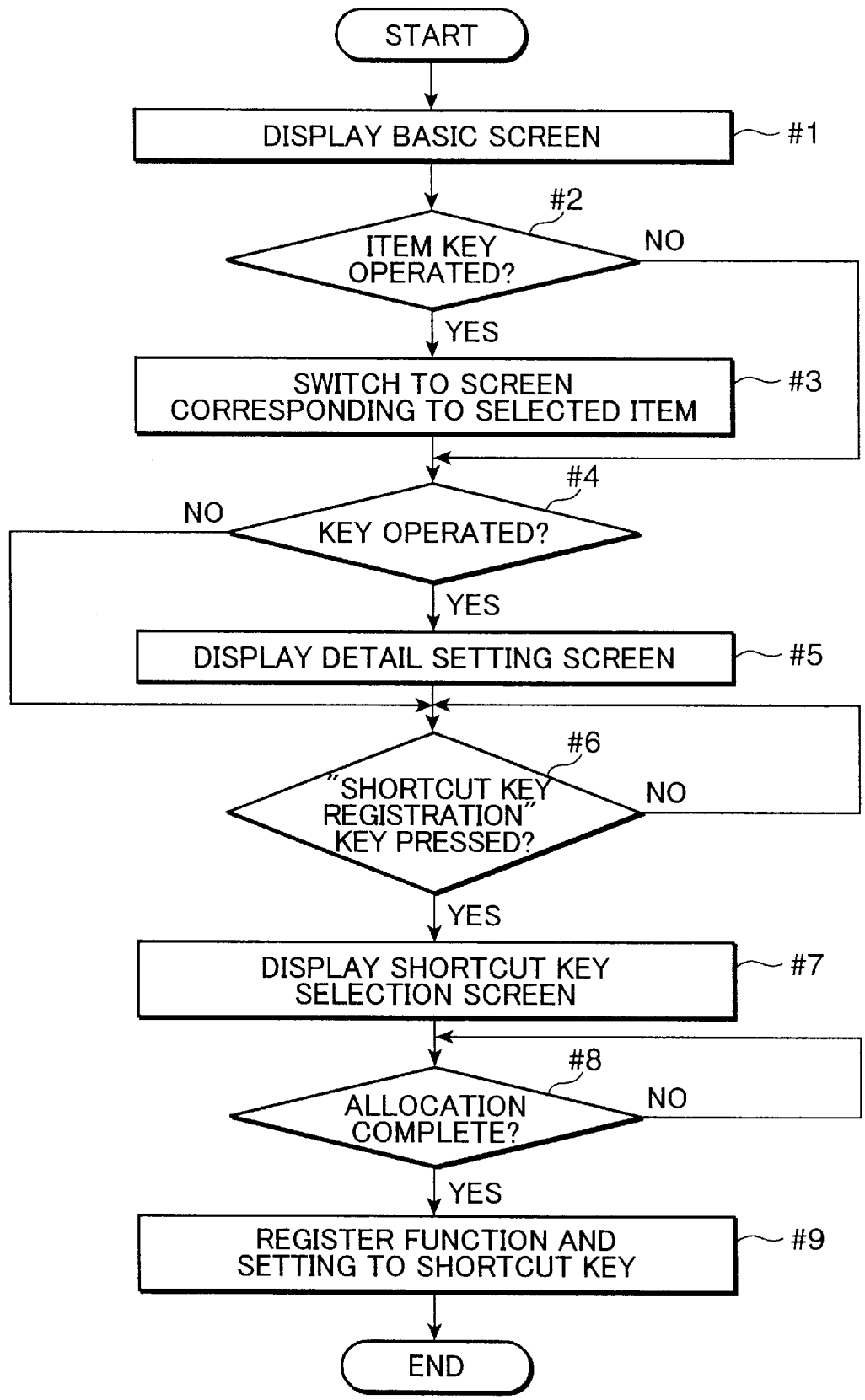
FIG. 18 is a flowchart diagram showing the operation of the function allocation processing.

Next, the function allocation processing of the copying machine 100 according to the present embodiment is now explained with reference to the flowchart shown in FIG. 18.

Foremost, when the power of the copying machine 100 is turned on, the basic screen 5 is displayed on the display unit 3 (step #1). Then, when either of the item keys "edit function" key 12 or the "finish" key 13 is operated in this basic screen 5 (YES in step #2), the screen switches to the item display screen corresponding to the selected item (step #3). For example, when the "edit function" key 12 is operated in the aforementioned basic screen 5, the edit function screen 6 is displayed. Then, it is judged whether the key in the displayed item display screen has been operated (step #4), and, when the key has been operated (YES in step #4), the function setting screen of such function is displayed (step #5). Further, in step #2, when no item key is operated in the basic screen (NO in step #2), the routine skips the processing of step #3 and proceeds to the processing of step #4.

In the respective function setting screens, when the operator sets his/her desired contents for the various functions and operates the "shortcut key registration" key (YES in step #6), the shortcut key selection screen is displayed (step #7), and the allocation procedures to the shortcut key is completed by the operator (step #8), the aforementioned functions and the like are allocated to the selected shortcut keys (step #9).

As described above, it is possible to set a plurality of shortcut keys and allocate functions appertaining to other items to such shortcut keys. Further, as the present invention is structured such that the name and icon corresponding to such function allocated to the shortcut key may be displayed on such shortcut key, the operator may select the desired function in accordance with the display of the shortcut key without having to refer to the operation manual or the like upon executing the function allocated to the shortcut key. In addition, the operator may also commence the copying operation by merely pressing the shortcut keys without having to set the selected functions. As a result, the operation of the operation device 1 becomes extremely easy, and the operability of the copying machine 1 is improved thereby.

Moreover, as the present invention is structured such that desired functions in the respective function setting screens may be allocated to shortcut keys, the allocation procedures of the function to be allocated may be conducted on the function setting screen of such function. Thus, in comparison to conventional cases where the function for allocating desired functions to the shortcut key appertains only to a single item, the allocation procedure is simplified.

Further, it is no longer necessary to be aware of which item the function to be allocated appertains to, and the troublesome work of having to refer to operation manuals of devices is no longer required.

In addition, as detailed functions may also be allocated to the shortcut keys, in comparison to conventional cases where detailed functions had to be sequentially set, the setting procedure of detailed functions will no longer be necessary if the setting of the detailed functions is nearly decided in advance, and it is thereby possible to avoid the labor upon making the copying machine execute the detailed functions.

Moreover, as functions appertaining to other items may be allocated to shortcut keys of the respective item display screens, for example, it will be possible to collectively display on a single screen the respective shortcut keys of the plurality of functions to be used simultaneously, or, when every shortcut key on a certain item display screen is registered, it will be possible to register the function on a shortcut key of a different item display screen, and the operability will be improved thereby.

Further, as text may be freely input from the keyboard of the text input screen to the shortcut key, names coinciding the user needs may be displayed on the shortcut keys, and the differentiation between keys can be further simplified, and the operability will be improved thereby.

In the aforementioned embodiment, the present invention was employed in an operation device of a copying machine. Nevertheless, without limitation thereto, the present invention may also be employed in operation devices of other image forming devices and image reading devices such as facsimile machines.

Although it is preferable to display the shortcut keys in the respective screens of the basic screen 5, edit function screen 6 and finish screen 7 as described in the first embodiment, it is also possible to display the shortcut keys in either one or two of the screens among screens 5~7.

Moreover, although the setting of detailed functions is displayed under the respective shortcut keys in the first embodiment, for example, it is also possible to simplify and display the settings of the detailed functions on the shortcut keys by taking the acronym of the respective names such as "consolidate—2—left—dotted" above the shortcut key upon the detailed functions of "consolidation" such as the settings of "2 in 1", "left staple" and "dotted line" being allocated to shortcut keys.

In addition to the aforementioned settings of the detailed functions, it is also possible to make the user himself/herself registerable to the shortcut key, and display the user name or initial or a symbol mark corresponding to such user on the shortcut key.

A "shortcut key registration" key may be provided to the basic screen 5, edit function screen 6 and finish screen 7, respectively. Thereby, for example, upon selecting the "consolidation" key B4 of the edit function screen 6 from the state where the basic screen 5 is being displayed, it will be possible to display the edit function screen to which the "consolidation" key B4 has been selected and set without having to operate the "edit function" key 12 so as long as the function of "consolidation" is allocated to any one of the shortcut keys of the basic screen 5 by using the aforementioned "shortcut key registration" key.

Figure 19:
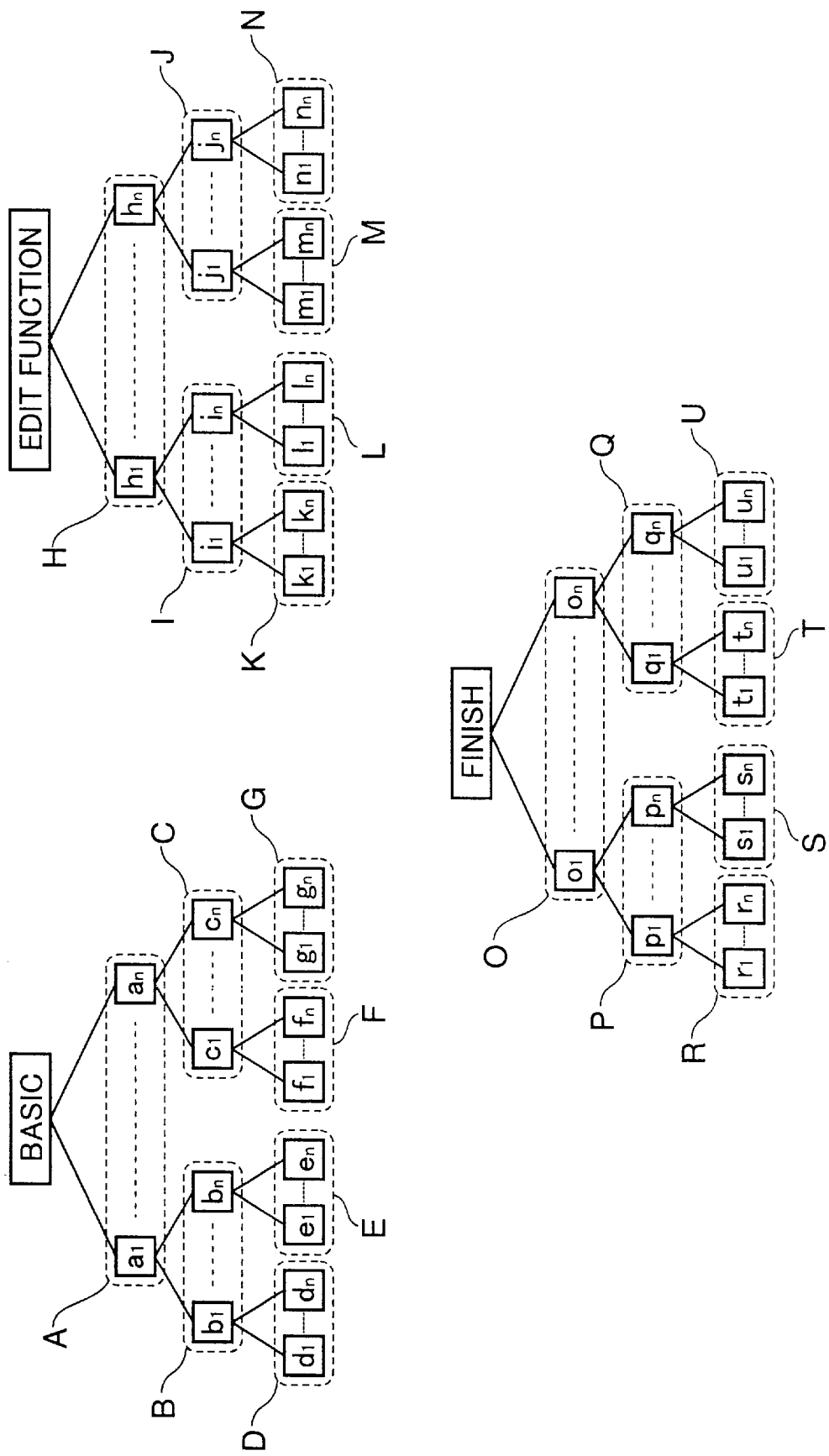
FIG. 19 is an explanatory diagram showing the state where a plurality of functions is classified into a tree shape.

As shown in FIG. 19, when a plurality of functions $a_1 \sim u_n$ are hierarchically provided in the basic function, edit function and finish function and function setting screens A~U for selecting and setting the respective functions $a_1 \sim u_n$ are also provided, it would be possible to provide a "shortcut key registration" key to each of such function setting screens A~U, such that, when such "shortcut key registration" key is operated, the functions selected and set prior to such operation will be allocated to the shortcut keys.

Further, for instance, it would be possible to allocate different types of functions such as function $d_1$ and function $h_n$ to a single shortcut key.

In the aforementioned embodiment, a plurality of shortcut keys were respectively provided to each of the item setting screens such that the shortcut key to which the set series of functions is to be allocated could be selected from among all shortcut keys. Nevertheless, without limitation thereto, it would suffice if at least one shortcut key is provided to each of the item setting screens such that the shortcut key to which the set series of functions is to be allocated could be selected from all or a part of the shortcut keys. Moreover, it would also be possible to provide a plurality of shortcut keys to only one item setting screen among the respective item setting screens described above such that the shortcut key to which the set series of functions is to be allocated may be selected therefrom.

The following is an example of another embodiment of the display screen of the basic screen of the display unit 3.

Figure 20:
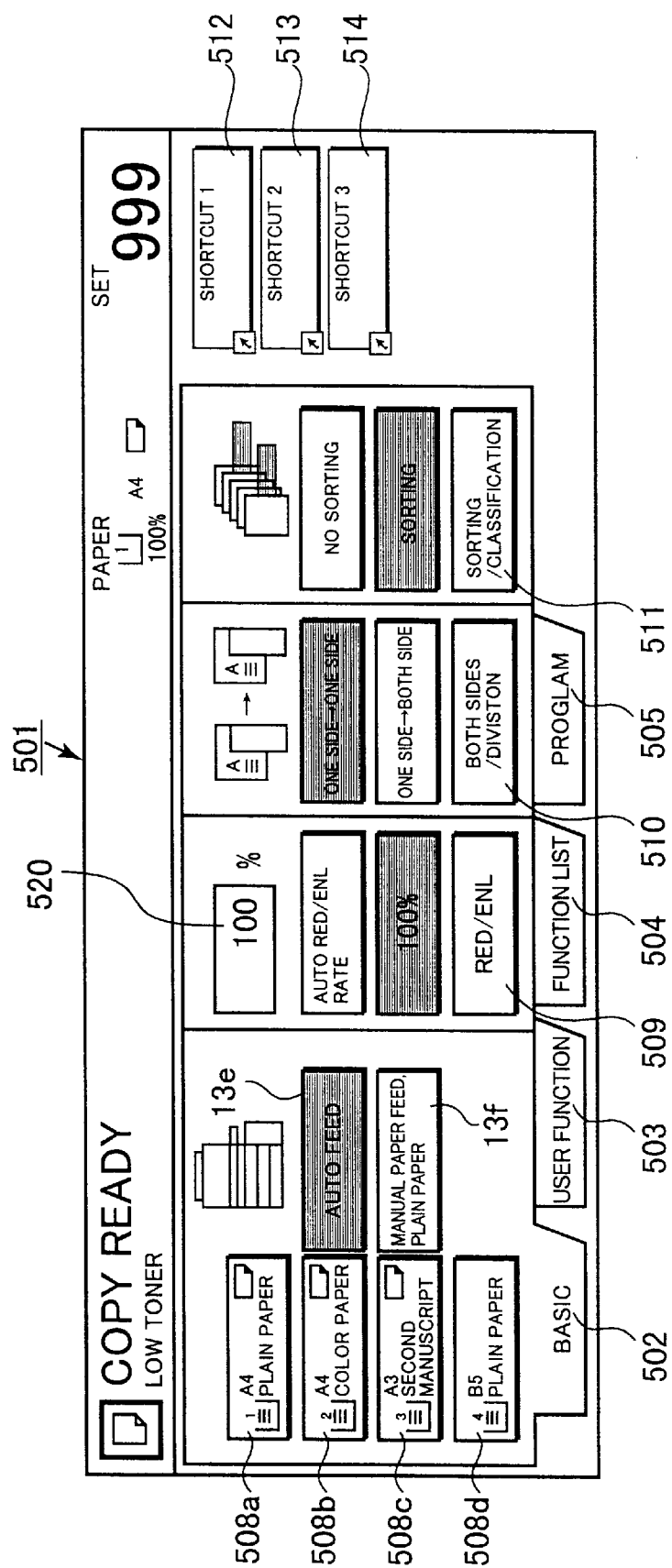
FIG. 20 is a diagram showing the second embodiment of the basic screen.
Figure 21:
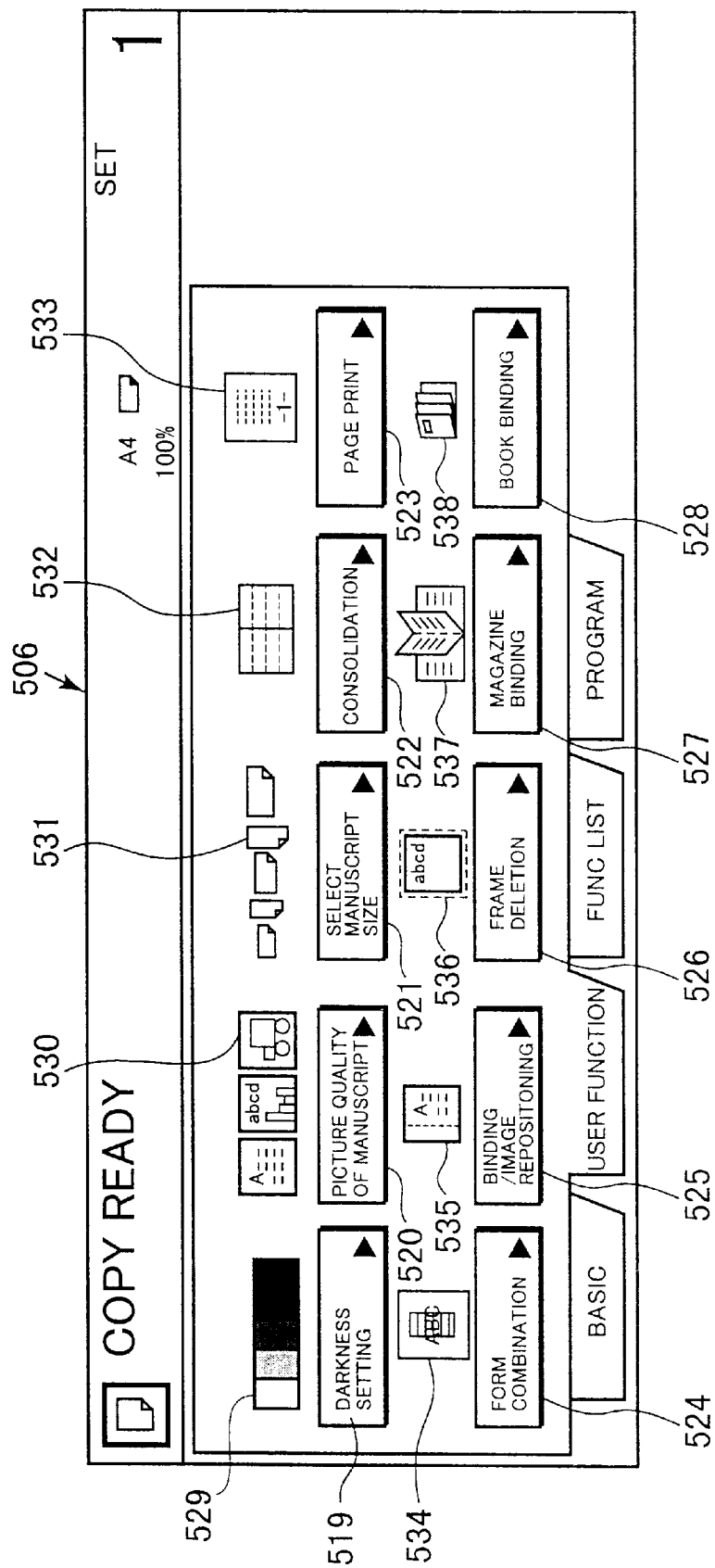
FIG. 21 is a diagram showing the user function screen.
Figure 22:
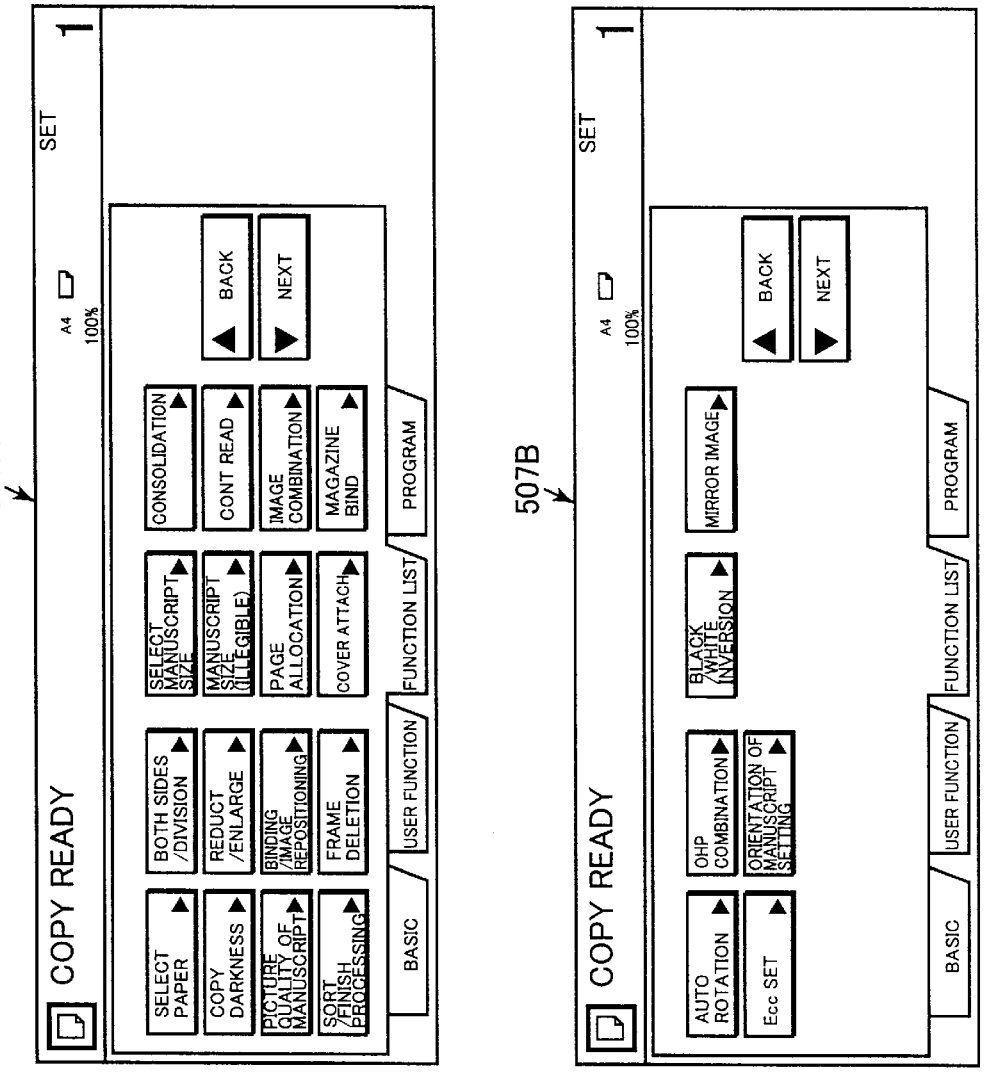
FIG. 22 is a diagram showing the list function screen.

FIG. 20 is the second embodiment of the basic screen. At the lower part of this basic screen 501, in addition to the "basic" tab 502 representing the basic screen 501, displayed are the respective tabs of "user function" tab 503, "function list" tab 504, and "program" tab 505. The user function screen 506 shown in FIG. 21 is displayed when the "user function" tab 503 is pressed and the function list screens 507A and 507B shown in FIGS. 22 and 23 are displayed when the "function list" tab 504 is pressed. Moreover, a program setting screen (not shown) for combining and registering the series of functions that operates the copying machine 100 is displayed when the "program" tab 505 is pressed.

Here, function selection keys 508*a*~508*f*, 509~511 appertaining to four functions are displayed on the basic screen 501 shown in FIG. 20; in other words, the function selection keys corresponding to the four functions of "select paper", "reduction/enlargement", "both sides/division" and "sort/classification". Among the above, the function selection key corresponding to the "select paper" function is displayed as six keys 508*a*~508*f* from the "A4 plain paper" key 508*a* to "manual paper feed, plain paper" key 508*f*. Further, three shortcut keys 512~514 are displayed in the margin, thereby enabling the setting and registration of three other functions in addition to the four functions described above. This basic screen 501 illustrates a state where "auto paper" is set with the "select paper" function, "100%" is set with the "reduction/enlargement" function, "one side one side" is set with the "both sides/division" function, and "no sorting" is set with the "sort/classification" function. When the respective keys of 509~511 of "reduction/enlargement", "both sides/division" and "sort/classification" are pressed in this basic screen 501, a screen for setting the detailed functions of the respective functions is displayed.

For example, when the function selection key 509 of "reduction/enlargement" is pressed, the function setting screen 515*a* shown in FIG. 23 is displayed, and when the key 516 of 50% is pressed, the display of the magnification selection screen 517 switches from 100% to 50% as shown in screen 515*b* of FIG. 23. When the "close" key 518 is pressed, the screen returns to the basic screen 501 shown in screen 515*c* of FIG. 23, 50% is displayed on the magnification ratio display unit 520, and the setting of copy magnification is completed thereby. When the start key 2*b* of FIG. 1 is pressed in this situation, copying will commence in accordance with the conditions selected with the respective functions keys.

Ten functions are displayed on the user function screen 506 shown in FIG. 21. In other words, the respective function selection keys 519~528 of "darkness setting", "picture quality of manuscript", "manuscript size selection", "consolidation", "page printing", "form combination", "binding/image repositioning", "frame deletion", "magazine binding" and "book binding" are displayed together with icons 529~538 representing such functions. When these function selection keys 519~528 are pressed, a screen for setting the detailed functions will be displayed.

Figure 24:
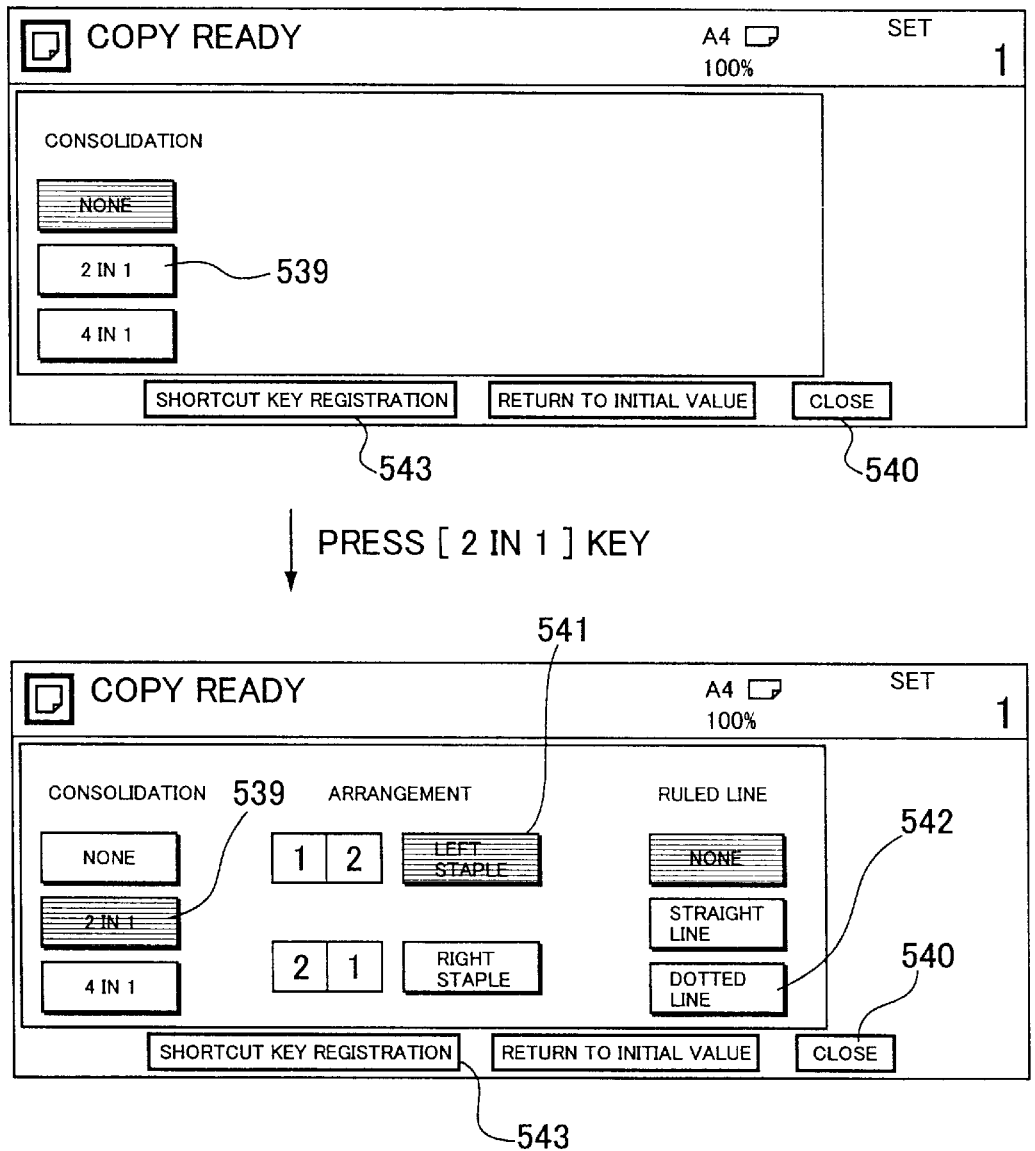
FIG. 24 is a diagram showing an example of a screen for setting the details of the "consolidation" function.

For example, when the function selection key 522 for "consolidation" is pressed, the first function setting screen shown as the top diagram of FIG. 24 is displayed, and when the "2 in 1" key 539 is pressed, the second function setting screen shown at the bottom diagram of FIG. 24 is displayed. Here, if the arrangement is set to "left staple", the ruled line is set to "none", and the "close" key 540 is pressed thereafter, the screen returns to the user function screen 506 shown in FIG. 21 and the detailed setting of consolidation is completed thereby. If the start key 2b is pressed under these settings, copying is conducted in accordance with the conditions selected with the respective function selection keys.

The respective function selection keys from "select paper" to "manuscript setting orientation" corresponding to all twenty-two types of functions of the copying machine 100 are displayed on the function list screens 507A, 507B shown in FIG. 22. When the respective functions selection keys are pressed, a screen for setting the detailed functions corresponding to each function is displayed. Moreover, in consideration of the size of the screen of the displayable portion, the display is made in two separate screens.

Figure 25:
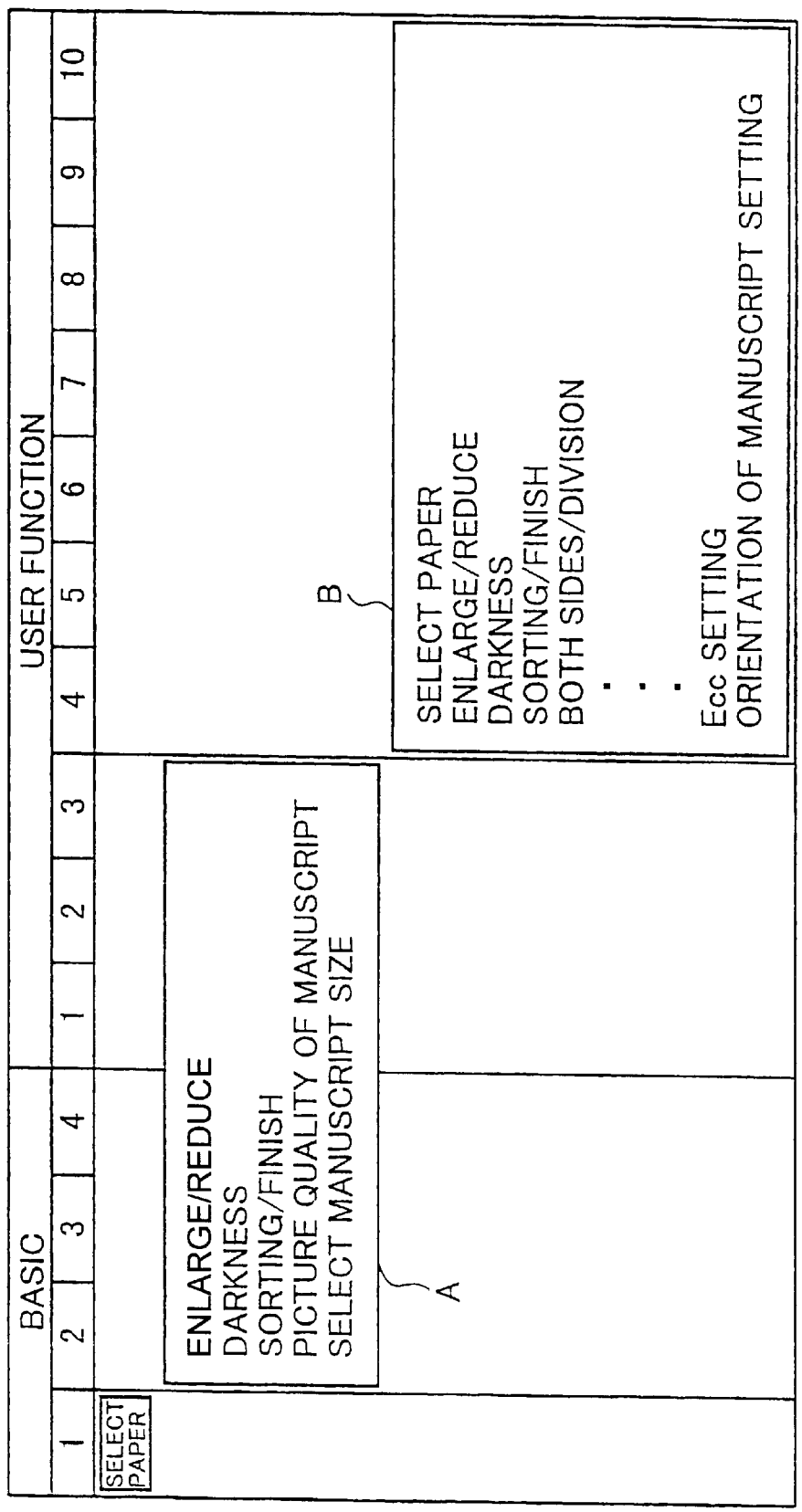
FIG. 25 is a diagram showing the priority level of functions among the function list.

Here, in the aforementioned basic screen 501, it is possible to arbitrarily select and display three functions excluding the "select paper" function from the six function groups A of FIG. 25 with the initial setting screen (not shown). Further, in the aforementioned user function screen 506, it is possible to select and display three functions not displayed on the basic screen 501 among the function group A with the initial setting screen (not shown), and, in addition to the three functions of this group A, it is further possible to select and display seven arbitrary functions from the function group B of FIG. 25. In other words, the most frequently used function of "select paper" is fixed on the basic screen 501, and the next frequently used six functions other than "select paper" are preferentially allocated to the basic screen 501 and user function screen 506 in order to improve the user's usability. Further, every function of the function group B is displayed in the twenty-two types of functions displayed on the function list screen 507A, 507B.

Figure 26:
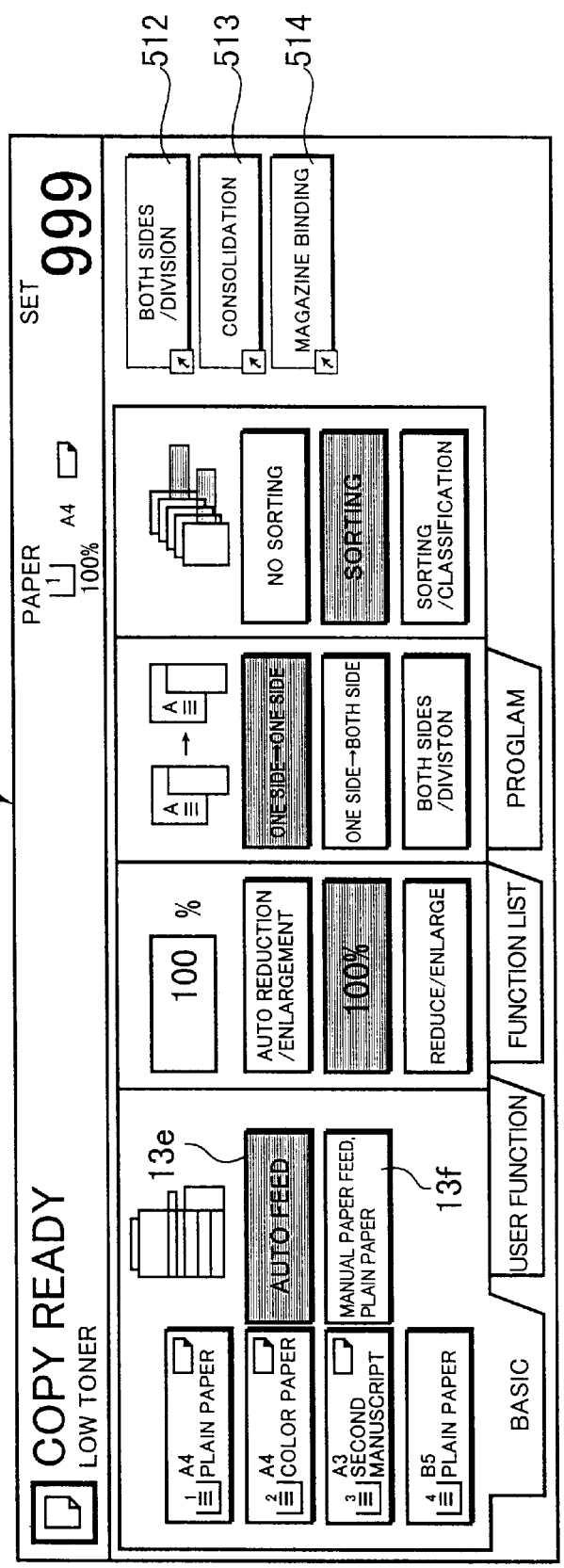
FIG. 26 is a diagram showing an example of the basic screen in a state where a name is input to the shortcut key from the name list.

In the basic screen 501 shown in FIG. 20 as described above, the three shortcut keys 512~514 are provided for reducing the number of key operations when the desired function is selected and to realize a speedy copying operation by allocating the desired functions and the setting of the detailed functions thereof among the twenty-two types of functions provided to the copying machine 100. For example, as shown in FIG. 26, the function of "both sides/ division", the function of "consolidation", and the function of "magazine binding/book binding" to the respective shortcut keys 512~514.

When the user presses the "consolidation" function selection key in the user functions screen 506 or the function list screens 507A, 507B, the screen switches to the function setting screen shown in FIGS. 24. Displayed on this function setting screen are the respective keys of "none", "2 in 1" and "4 in 1". When the "2 in 1" key 539 is pressed in this function setting screen, the screen switches to the function setting screen in the bottom of FIG. 24. Then, for example, if the "left staple" key 541 is selected for the arrangement, the "dotted line" key 542 is selected for the ruled line, and the "shortcut key registration" key 543 is pressed in the function setting screen, the screen switches to the registration key designation screen shown in FIG. 27. Displayed on this registration key designation screen are a "shortcut 1" key 544, "shortcut 2" key 545, and "shortcut 3" key 546. As the "both sides/division" function has been allocated to the "shortcut 1" key 544, the text showing the function of "both sides/division" is being displayed. And, when the "shortcut 2" key 545 is pressed, the screen may be switched to the name input screen G1 shown in FIG. 7.

This application is based on Japanese Patent Application Ser. No. 2000-232190 filed on Jul. 31, 2001 and Ser. No. 2001-080092 filed on Mar. 21, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An operation control device for controlling an apparatus having a plurality of functional modes, comprising:
    a display device;
    an operator input device for permitting selections to be made by the operator;
    a display controller for displaying function setting screens, configured in a hierarchy, having function selections displayed thereon for setting ones of said plurality of functional modes using said operator input device, said function setting screens of said hierarchy including:
        top level screens having shortcut selections to which a set of function settings selected using said function selections are allocatable; and
        lower level screens accessible via said top level screens and none or more of others of said lower level screens, said lower level screens including detailed function selections of said function selections, and a registration selection for allocating to one of said shortcut selections of said top level screens set ones of said detailed function selections which are set at a time of selecting said registration selection;
    an allocation controller for allocating to said one of said shortcut selections of said top level screens said set ones of said detailed function selections when said registration selection is selected using said operator input device; and
    a function setting controller for setting ones of said plurality of functional modes into operation in response to selection of said function selections and said shortcut selections, wherein selection of ones of said shortcut selections operates said display controller to display said detailed function selections which were set at the time of selecting said registration selection for said selected ones of said shortcut selections.

2. The operation control device according to claim 1, wherein when said registration selection is selected, said allocation controller allocates a series of said function selections selected before display of the lower level screen having said registration selection, as well as said set ones of said detailed function selections in said lower level screen having said registration selection, to said shortcut selections.

3. The operation control device according to claim 1, wherein when said registration selection is selected, said display device displays said one of said shortcut selections on said display device in a display mode different from other ones of said shortcut selections to which no functions are allocated.

4. The operation control device according to claim 1, wherein when said registration selection is selected, said display device displays an indication of the set ones of said detailed function selections in a display area of said one of the shortcut selections.

5. The operation control device according to claim 1, wherein when said registration selection is selected, said display device displays a pre-prepared formalized name selection screen on said display device, and when a formalized name is selected with said formalized name selection screen, said display device displays the selected formalized name as a name of said one of the shortcut selections.

6. The operation control device according to claim 1, wherein when said registration selection is selected, said display device displays a pre-prepared text input screen on said display device, and when a name of said one of the shortcut selections is input with said text input screen, said display device displays an indication of said set ones of said detailed function selections and the name inputted as the name of said one of said shortcut selections.

7. The operation control device according to claim 1, wherein when said registration selection is selected, said display device displays a pre-prepared icon selection screen on said display device, and when an icon is selected with said icon selection screen, said display device displays an indication of said set ones of said detailed function selections and the icon selected as an icon of said one of said shortcut selections.

8. The operation control device according to claim 1, wherein when said registration selection is selected, said display device displays a pre-prepared formalized name selection screen and an icon selection screen on said display device, and when a formalized name and an icon are selected respectively using said pre-prepared formalized name selection screen and said icon selection screen, said display device displays the formalized name and the icon selected as the name and icon of said one of said shortcut selections.

9. The operation control device according to claim 1, wherein when said registration selection is selected, said display device displays a pre-prepared text input screen and an icon selection screen on said display device, and when a name is input and an icon is selected respectively using said pre-prepared text input and icon selection screens, said display device displays the input name and the icon selected as the name and icon of said one of said shortcut selections.

10. The operation control device according to claim 1, wherein said display device displays a plurality of shortcut selections, and said allocation controller is constructed such that said one of said shortcut selections is selectable from said plurality of shortcut selections.

11. The operation control device according to claim 1, wherein said display device displays a plurality of shortcut selection display screens each of which having at least one shortcut selection, and said allocation controller is constructed such that said one of said shortcut selections is selectable from said plurality of shortcut selections.

12. The operation control device according to claim 1, wherein said display device displays a plurality of shortcut selection display screens each of which having a plurality of shortcut selections, and said allocation controller is constructed such that said one of said shortcut selections is selectable from said plurality of shortcut selections of said plurality of shortcut selection display screens.

13. The operation control device according to claim 1, wherein said display device displays at least one shortcut selection display screen including a plurality of shortcut selections, and said allocation controller is constructed such that said one of said shortcut selections is selectable from said plurality of shortcut selections.

14. The operation control device according to claim 1, wherein a top level screen of said function setting screens having said shortcut selections is displayed immediately after power of said operation control device is turned on.

15. The operation control device according to claim 1, wherein said top level screens having said shortcut selections are provided with a selection input for switching from said top level screens to said lower level screens.

16. The operation control device of claim 1, wherein said operator input device is included in said display device as a touch screen.

* * * * *